United States Patent
Cruz et al.

(10) Patent No.: US 10,921,131 B1
(45) Date of Patent: Feb. 16, 2021

(54) SYSTEMS AND METHODS FOR INTERACTIVE DIGITAL MAPS

(71) Applicant: Capital One Services, LLC, McLean, VA (US)

(72) Inventors: Ana Cruz, Arlington, VA (US); Joseph Boayue, Reston, VA (US); Lee Adcock, Richmond, VA (US); Christopher Camenares, Falls Church, VA (US); Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/704,233

(22) Filed: Dec. 5, 2019

(51) Int. Cl.
| | |
|---|---|
| *G01C 21/20* | (2006.01) |
| *H04W 4/80* | (2018.01) |
| *H04W 4/021* | (2018.01) |
| *H04W 4/024* | (2018.01) |

(52) U.S. Cl.
CPC .......... *G01C 21/206* (2013.01); *H04W 4/021* (2013.01); *H04W 4/024* (2018.02); *H04W 4/80* (2018.02)

(58) Field of Classification Search
CPC ...... G01C 21/206; H04W 4/80; H04W 4/024; H04W 4/021
See application file for complete search history.

(56) References Cited

U.S. PATENT DOCUMENTS

| | | | |
|---|---|---|---|
| 7,233,863 B2 | 6/2007 | Rodriguez | |
| 9,140,555 B1 * | 9/2015 | Andersson | H04W 4/38 |
| 9,202,180 B2 | 12/2015 | Denker et al. | |
| 9,367,848 B2 | 6/2016 | Salles | |
| 9,467,809 B2 | 10/2016 | Lopez | |
| 2012/0029817 A1 * | 2/2012 | Khorashadi | G01C 21/20 |
| | | | 701/451 |
| 2012/0232790 A1 * | 9/2012 | Goel | G01C 21/3476 |
| | | | 701/451 |
| 2012/0323612 A1 | 12/2012 | Callaghan | |
| 2014/0032250 A1 | 1/2014 | Oxenham et al. | |
| 2014/0195277 A1 | 7/2014 | Kim | |
| 2014/0347492 A1 * | 11/2014 | Fales | G01C 11/06 |
| | | | 348/164 |
| 2016/0034826 A1 | 2/2016 | Singh et al. | |
| 2016/0131487 A1 | 5/2016 | Xu et al. | |
| 2017/0031925 A1 * | 2/2017 | Mishra | G06T 11/20 |

(Continued)

*Primary Examiner* — Kira Nguyen
(74) *Attorney, Agent, or Firm* — Finnegan, Henderson, Farabow, Garrett & Dunner LLP

(57) ABSTRACT

A system for generating a map with spots. The system includes processors and storage devices storing instructions that, when executed, configure the processors to perform operations. The operations may include receiving a map request of a venue, the map request comprising first location data associated with the venue, and transmitting a map data file for the venue, the map data file comprising a presentation of a plurality of spots in the venue and the spots being associated with confidence levels. The operations may also include receiving an add-spot request, the add-spot including data of an additional spot to be added, second location data associated with the additional spot, and verification data. The operations may also include determining a confidence level for the additional spot, modifying the map data file to include a representation of the additional spot, and transmitting the modified map data file.

20 Claims, 18 Drawing Sheets

(56) References Cited

U.S. PATENT DOCUMENTS

| | | | |
|---|---|---|---|
| 2017/0076229 A1* | 3/2017 | Sunshine | G06Q 10/02 |
| 2017/0219355 A1 | 8/2017 | Oxenham et al. | |
| 2018/0249298 A1* | 8/2018 | Jain | H04L 67/18 |
| 2019/0172165 A1* | 6/2019 | Verteletskyi | G05B 19/042 |

* cited by examiner

SYSTEMS AND METHODS FOR INTERACTIVE DIGITAL MAPS

TECHNICAL FIELD

The present disclosure relates generally to systems and methods for generating or modifying interactive digital maps and, more particularly, to systems and methods for generating interactive digital maps displaying spots, such as seating spots, where the spots may be added, verified, and/or removed based on user requests.

BACKGROUND

Digital mapping is the process of compiling geographical information in a virtual image. The technology allows creating interactive maps in which users can perform operations like zoom in and out, measure distances, and identify locations. Further, digital maps may be rendered on graphical user interfaces that display maps as digital tools for navigation. Digital mapping can be found in a variety of computer applications, such as positioning applications based on Global Positioning System (GPS) and automotive navigation systems. Moreover, mobile computing (including PDAs, tablets, and smartphones) combined with the wide availability of GPS location devices has recently spurred digital navigation tools that use digital mapping on mobile computing devices.

Digital mapping and navigation, however, has not been successful in certain contexts in which it is difficult to gather and digitize geographical information. For example, digital mapping and navigation has been unsuccessful in indoor venues, where the GPS signals are unreliable, and data cannot be captured with satellite imaging. Without GPS signals or satellite imagining it is difficult to collect the geographical information required to generate map data files. Further, with current digital mapping techniques, digital maps are difficult to update. Although digital mapping has been successful in mapping static elements (such as roads or highways), it has been challenging to use digital mapping in quickly evolving settings. For example, digital mapping of venues like office spaces is particularly challenging because offices are normally indoors (reducing strength of GPS signals and preventing the use of satellite imaging) and they have topologies that change frequently (e.g., changes in cubicle arrangements). Current computerized systems have limited tools to keep up with such frequent changes. Moreover, digital mapping techniques that rely primarily on satellite images to collect data may generate maps that lack the precision required for certain applications. For example, standard GPS has a resolution between 5-30 meters, depending on several factors. However, applications for navigating to a seating spot in a venue may require a higher resolution than what SPS provides.

The lack of accurate digital mapping techniques for certain contexts (such an indoor venues), interferes with some navigation tools. Poor availability of information, lack of reliable location methods, and the inability to quickly update maps, result in a poor user experience when using indoor navigation tools. For instance, there are no effective navigation tools that allow patrons of an entertainment venue, such a cinema or a theater, to identify an available seating spot. Instead, patrons normally need to scan the entire venue in order to find an available seat. A similar problem has developed with the advent of communal workspaces. A worker normally needs to scan the full communal workspace until determining which working spots are available and where they are located. Overall, poor mapping techniques for these contexts results in a frustrating user experience and lack of effective digital navigation tools.

The disclosed systems and methods for generating and modifying interactive digital maps address one or more of the problems set forth above and/or other problems in the prior art.

SUMMARY

One aspect of the present disclosure is directed to a system for generating a map with spots. The system may include one or more processors and one or more storage devices storing instructions that, when executed, configure the one or more processors to perform operations. The operations may include receiving a map request of a venue (the map request comprising first location data associated with the venue) and transmitting a map data file for the venue including a presentation of a plurality of spots in the venue (where the spots are associated with confidence levels). The operations may also include receiving an add-spot request including data of an additional spot to be added to the map data file, second location data associated with the additional spot, and verification data. The operations may also include determining a confidence level for the additional spot by comparing the add-spot request with previous add-spot requests, modifying the map data file to include a representation of the additional spot when the confidence level is above a threshold, and transmitting the modified map data file.

Another aspect of the present disclosure is directed a non-transitory computer-readable medium storing instructions that, when executed by a processor, cause the processor to operate a system for generating a map with spots. The operations may include receiving a map request of a venue (the map request comprising first location data associated with the venue) and transmitting a map data file for the venue including a presentation of a plurality of spots in the venue (where the spots are associated with confidence levels). The operations may also include receiving an add-spot request including data of an additional spot to be added to the map data file, second location data associated with the additional spot, and verification data. The operations may also include determining a confidence level for the additional spot by comparing the add-spot request with previous add-spot requests, modifying the map data file to include a representation of the additional spot when the confidence level is above a threshold, and transmitting the modified map data file.

Yet another aspect of the present disclosure is directed to a computer-implemented method for generating a map with spots. The method may include receiving a map request of a venue (the map request comprising first location data associated with the venue) and transmitting a map data file for the venue including a presentation of a plurality of seating spots in the venue (where the seating spots are associated with confidence levels). The operations may also include receiving an add-spot request, the add-spot request including data of an additional spot to be added to the map data file, second location data associated with the additional spot, and verification data. The operations may also include determining a confidence level for the additional seating spot by comparing the add-spot request with previous add-spot requests, modifying the map data file to include a representation of the additional spot when the confidence level is above a threshold, and transmitting the modified map data file.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
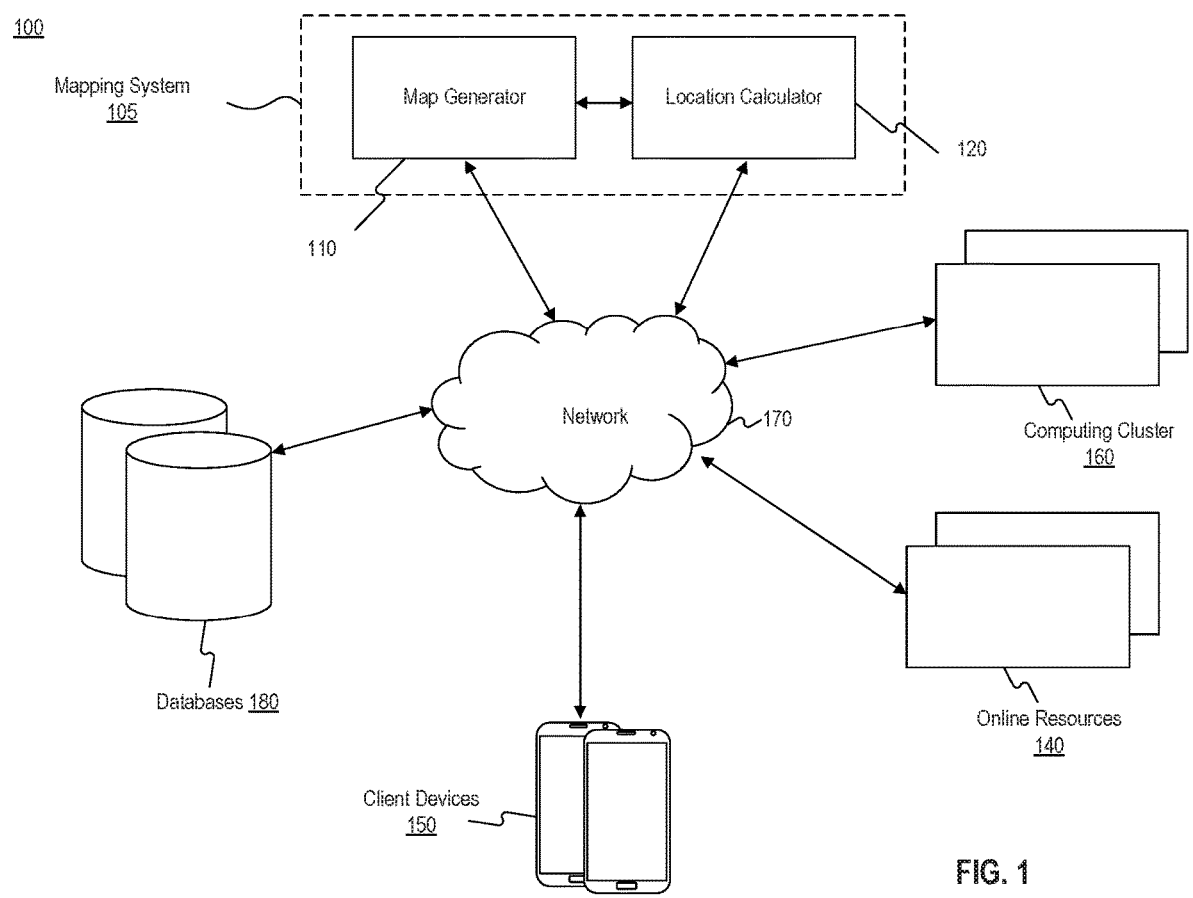
FIG. 1 is a block diagram of an exemplary system, consistent with disclosed embodiments.

The disclosure is generally directed to systems and methods for generating and modifying interactive digital maps. The disclosed systems and methods improve the technical field of digital mapping by facilitating the collection of geographical information from multiple sources. Particularly, the disclosed systems and methods enable compilation of user-collected information to generate digital maps with enhanced accuracy and/or updating of digital maps. For example, the disclosed systems and methods may provide an automated framework that captures, categorizes, evaluates, and verifies user-collected geographical information to then generate or modify map data files. These features of the disclosed systems enable crowdsourcing of information for digital mapping, resulting in digital mapping techniques that are more precise and easier to use and update.

Further, some embodiments of the disclosed systems and methods may solve technical problems of user navigation with mobile computing devices. Current navigation systems are not usable in some contexts where GPS signals are weak or unreliable. The disclosed systems and methods solve technical issues for finding a location in those contexts by providing alternative sources of location information. For instance, the disclosed systems and methods may enhance digital map accuracy by employing multi-tiered location identification processes, which use different sources of location information, and leveraging user-collected information to enhance accuracy. By gathering and combining multiple sources of a user location, the disclosed systems may determine user locations precisely, even in places where GPS is not reliable or available. For example, the disclosed systems and methods may combine sources of digital information, including user-collected data, WiFi records, Bluetooth Low Energy (BLE) data, and/or accelerometer data, to estimate locations. Such combination of multiple sources of information may allow the disclosed systems and methods to address technical challenges of current digital mapping and navigation systems and improve their precision.

The disclosed systems and methods may also improve user experience with digital maps and/or enable new mapping or navigation applications. For example, the disclosed systems may generate more accurate indoor maps by capturing user-collected information, updating map data files frequently, and collecting multiple sources of digital data. Further, the disclosed systems and methods may enable new applications that are not feasible with current digital mapping technology. For instance, current digital maps are ineffective in contexts that require quick updates or venues that do not have accurate or reliable GPS information. Thus, current digital maps cannot be used for applications directed to finding spots such as seating spots in venues such as offices because office configurations may become quickly outdated (e.g., they are difficult to update with rapidly changing information) and/or lack adequate precision (e.g., due to lack of reliable or available GPS information or satellite imagery). The disclosed systems and methods may resolve these technical issues by providing tools and methods to more accurately update and broadcast data files associated with the venue. Further, the disclosed systems and methods may enable mapping applications in other contexts that require quick updates, such as finding parking spots, or require indoor location services, such as navigating through a shopping center. Hence, the disclosed systems and methods may improve the technical field of digital mapping and enable applications for contexts in which standard digital mapping are not precise or cannot be updated.

Further the disclosed systems and methods may be employed to effectively manage screen space in devices used for navigation or mapping. Particularly for mobile devices, in which the screen space is limited, the disclosed systems and methods may generate dynamic GUIs that selectively display only elements that are relevant for a specific location. For example, the disclosed methods may include processes to dynamically modify map GUIs based on user location and enhance certain icons/elements. Further, the disclosed systems and methods may include processes to crop and modify map views to maximize screen space with elements of interest. For instance, the disclosed methods may include eliminating, minimizing, enlarging, hiding, and/or re-shaping icons based on user location and/or selections to improve user interactions with a GUI. Further, to improve GUIs in portable screens, the disclosed systems may perform methods that determine the intensity in which each element are being displayed. Based on the verification or confidence levels of certain spots or features, the disclosed methods may modify the intensity in the display and/or generate alerts. By manipulating the intensity of elements in the display, the disclosed methods may call attention of users to specific elements in the GUI and improve accuracy and prevent inaccurate entries.

Moreover, the disclosed systems and methods may be used to generate GUIs with interactive elements to facilitate communication with, and provide feedback to, map generators. For example, in some embodiments of the disclosed systems, map generators may update map data files using user-collected information. The disclosed systems and methods may provide interactive GUIs that allow users to quickly provide feedback to map generators so they can autonomously update and broadcast map data files. For example, GUIs generated with the disclosed systems and methods may allow users to correct, confirm, or create elements in a map. Thus, the disclosed systems and methods may facilitate capturing geographical data for digital mapping.

In such embodiments, the disclosed systems and methods may be employed to leverage user information when modifying map data files. For example, information captured with GUIs configured to gather user input may be used to create "patches" (i.e., a set of changes to a computer program or its supporting data designed to update, fix, or improve it) for map data files. The patches may modify or update the map. Alternatively, or additionally, the patches may provide alerts in the map GUI, correct inaccuracies, and/or improve map configurations.

In some embodiments, patches and/or map data files may be compressed to minimize congestion on transmission networks with limited bandwidth, such as cellular networks, and quickly update GUIs. The disclosed systems may improve mobile computer functionality by compressing the update patches or map data files to minimize processing burden. Further, the disclosed systems may also improve mobile computer functionality by distributing databases and servers in locations that minimize network congestion. For example, the disclosed systems and methods may employ edge servers that perform some of the verification operations to quickly verify user data and deploy patches or map data files in client devices.

Reference will now be made in detail to the disclosed embodiments, examples of which are illustrated in the accompanying drawings.

FIG. 1 is a block diagram of an exemplary system 100, consistent with disclosed embodiments. System 100 may be used to generate interactive digital maps using user-collected information and to prepare or modify map GUIs for portable devices. System 100 may include a mapping system 105 which may include a map generator 110 and a location calculator 120. System 100 may additionally include online resources 140, client devices 150, computing clusters 160, and database 180. In some embodiments, as shown in FIG. 1, components of system 100 may be interconnected via a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services, navigation data centers, and/or servers that store web pages for places such as entertainment venues and/or offices. Alternatively, or additionally, online resources 140 may be associated with service providers, such as financial service providers. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of map changes via alerts, and/or completion messages and notifications. In some embodiments, online resources 140 may include servers associated with both venues, indoor location services, and finance services for seating spot reservation. In such embodiments, online resources 140 may store geographical information, seating information (including price, location, and availability), and information about client accounts, including their credit information in the financial service.

Client devices 150 may include one or more computing devices configured to perform one or more operations consistent with disclosed embodiments. For example, client devices 150 may include a desktop computer, a laptop computer, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that when executed by a processor performs Internet-related communication, such as TCP/IP, and content display processes. For instance, client devices 150 may execute browser software that generates and displays graphical user interfaces (GUIs) displaying maps for navigation or GUIs that allow users to provide feedback for crowdsource digital mapping.

Client devices 150 may execute applications that allow client devices 150 to communicate with components over network 170 and generate and display content in GUIs via display devices included in client devices 150. Displays of client devices 150 may be configurable to display GUIs as described in connection with FIGS. 14-18. The disclosed embodiments are not limited to any particular configuration of client devices 150. For instance, a client device 150 may be a mobile device that stores and executes mobile applications to perform operations that provide functions offered by mapping system 105 and/or online resources 140, such as providing map data files stored in a database 180. In certain embodiments, client devices 150 may be configured to execute software instructions relating to location services, such as GPS services or indoor location services, further discussed in connection with FIG. 12. For example, client devices 150 may be configured to determine a geographic location and provide location data. Alternatively, or additionally, client devices 150 may have camera to capture still images and/or video. Client devices 150 are further described in connection with FIG. 5.

Computing clusters 160 may include one or more computing devices in communication with other elements of system 100. For example, in some embodiments, computing clusters 160 may consist of a group of processors in communication through fast local area networks. In other embodiments computing clusters 160 may consist of an array of graphical processing units configured to work in parallel as a graphics processing unit (GPU) cluster. In such embodiments, computer clusters 160 may include heterogeneous or homogeneous hardware. In some embodiments, computing clusters 160 may include GPU drivers for the various types of GPUs present in cluster nodes, a Clustering Application Programming Interface (API), such as the Message Passing Interface (MPI), and VirtualCL (VCL) cluster platform such as a wrapper for OpenCL™ that allows applications to transparently utilize multiple OpenCL devices in a cluster. In yet other embodiments, computing clusters 160 may operate with distcc (a program to distribute builds of C, C++, Objective C or Objective code across several machines on a network to speed up building), and MPICH (a standard for message-passing for distributed-memory applications used in parallel computing), Linux Virtual Server™, Linux-HA™, or other director-based clusters that allow incoming requests for services to be distributed across multiple cluster nodes.

Database 180 may consist of one or more computing devices configured with appropriate software to perform operations consistent with providing data to elements of system 100. For example, database 180 may provide data related to places and users to mapping system 105, map generator 110, and/or location calculator 120. Database 180 may include, for example, Oracle™ databases, Sybase™ databases, or other relational databases or non-relational databases, such as Hadoop™ sequence files, HBase™, or Cassandra™. Database 180 may include computing components (e.g., database management system, database server, etc.) configured to receive and process requests for data stored in memory devices of the database(s) and to provide data from the database(s).

While database 180 are shown separately, in some embodiments database 180 may be included in or otherwise related to one or more of mapping system 105, map generator 110, location calculator 120, and online resources 140.

Database 180 may be configured to collect and/or maintain geographical data associated with places, such as venues or office spaces, by querying online resources 140. Database 180 may provide such data to the mapping system 105, location calculator 120, and client devices 150. Thus, database 180 may collect data from a variety of sources, including, for instance, online resources 140. Database 180 are further described below in connection with FIG. 4.

Location calculator 120 may include one or more computing devices configured to determine a location of a user or a location of a feature in a map. Location calculator 120 may receive or obtain data from database 180, computing clusters 160, client devices 150, and/or online resources 140. For example, location calculator 120 may receive a layout of a venue through database 180, online resources 140, and/or client devices 150. Alternatively, or additionally, location calculator 120 may employ a web scraper to collect location data from elements of system 100.

In some embodiments, location calculator 120 may be configured to calculate locations based on different sources of information. For example, location calculator 120 may estimate locations based on GPS data, using techniques such as Time Difference of Arrival (TDOA). Further, location calculator 120 may estimate locations based on WiFi signals using, for example, Wi-Fi positioning system (WPS) or WiPS/WFPS. Alternatively, or additionally, location calculator may determine a location combining BLE data with GPS information. For example, location calculator 120 may employ indoor location services with virtual BLE and/or Beacon signal computation to determine locations. Moreover, location calculator 120 may utilize accelerometer and/or gyroscope signals to estimate locations. Further, location calculator 120 may use Received Signal Strength Indicator (RSSI)-Based indoor localization and tracking, collect information with shoe-mounted inertial sensors, or collect pedometer information. In some embodiments, as further disclosed in connection to FIG. 12, location calculator 120 may combine these signals to estimate and adjust locations.

In some embodiments location calculator 120 may perform location estimation based on images. For example, as further discussed in connection to FIG. 3, location calculator 120 may perform image recognition that identifies context clues from user images to determine locations. In such embodiments, location calculator may be configured to associate context clues identified in an image with elements stored for images associated with venues. For example, location calculator 120 may be configured to retrieve images associated with a place form database 180, identify context clues in the retrieved images, and identify a location based on a user image by correlating context clues associated with the retrieved images with context clues in the user images.

Map generator 110 may include one or more computing devices configured to perform operations consistent with generating or updating digital map data files and/or map GUIs. For example, map generator 110 may perform operations to compile geographic information received from client devices 150 and generate a map data file for a venue that includes a seating layout and available seats. In some embodiments, map generator 110 may also handle requests from client devices 150 to update or modify map data files. For example, as further disclosed in connection with FIG. 7, mapping system 105 may receive an add-spot request from client devices 150. Map generator 110 may handle the request by, for example, determining whether the add-spot request has enough verification information. Based on the determination, map generator 110 may update map data files associated with the corresponding place. Map generator 110 may also handle other requests such as removing or verifying seating spots in a place.

Map generator 110 may generate map data files based on compiled user information (e.g., received from client devices 150) and location data (e.g., received from location calculator 120). For example, map generator 110 may receive user information of a seating spot in a venue. This user information may be associated with location data that gets processed by location calculator 102. Then map generator 110 may generate or update a map data file, such as a GIS file with the user and location data. The map data file, created by map generator 110, may include a raster format or a vector format.

For example, map generator 110 may generate or update data files in one or more raster formats, such as Arc Digitized Raster Graphic (ADRG) format or Binary format—where multiple bands are stored in BSQ (band sequential), BIP (band interleaved by pixel) or BIL (band interleaved by line). Further, map generator may generate or modify map data files in a Digital Raster Graphic (DRG) file, an Enhanced Compressed Raster Graphics (ECRG) file, an Enhanced Compressed Wavelet (ECW) file, or an ESRI grid.

Moreover, the map data file generated by map generator 110 may also include GeoTIFF, IMG, JPEG2000, Multi-Resolution Seamless Image Database (MrSID), or RPF files.

Alternatively, or additionally, map generator 110 may be configured to generate vector format files. For example, map generator 110 may generate map data files that include files in formats such as AutoCAD DXF, Digital line graph (DLG), Esri TIN, Geography Markup Language (GML), GeoJSON, GeoMedia, ISFC, Keyhole Markup Language (KML), or Mapinfo TAB format. Other vector formats that may be employed by map generator 110 include National Transfer Format (NTF), Spatialite, Shapefile (e.g., SHP, SHX, DBF, PRJ), SOSI, and/or Vector Product Format (VPF). Further, map generator 110 may create composite map data files that include both raster formats and vector formats.

Moreover, map generator 110 may be configurable to generate or edit grid formats or map data file formats that are not represented by vector or raster formats. For example, map generator 110 may modify or generate files such as USGS DEM files, GTOPO30, Digital Terrain Elevation Data(DTED) files, Dual Independent Map Encoding (DIME) files, and/or GeoPackage (GPKG) files.

In some embodiments, map generator 110 may generate patches for already developed map data files or GUIs. Map generator 110 may generate a patch that may include a set of changes to the map data files to update, fix, or improve the map. For example, map generator 110 may generate patches to indicate seats in a venue that are no longer available. The patch may also include fixing security vulnerabilities and other bugs that cause inaccuracies. The patch generated by map generator 110 may also adjust the intensity of the displayed elements and improve the GUI usability or performance. For example, the patch may be directed to improving graphical user interfaces and/or correct feedback processes.

Moreover, map generator 110 may generate instructions to display GUIs in client devices 150. Based on identification information of client devices 150 and location information from client devices 150, map generator 110 may generate and transmit instructions to display GUIs in client devices 150. Further, map generator 110 may generate instructions to modify a graphical user interface to include identification information associated with the received image. Map generator 110 is further described below in connection with FIG. 2.

Although in FIG. 1 map generator 110 is shown as part of mapping system 105, in some embodiments (not shown) map generator 110 may be implemented by other elements of system 100. For example, map generator 110, or functions performed by map generator 110 may be performed in client devices 150. Client devices 150 may execute map generator 110 functions and modify or generate map data files.

Moreover, FIG. 1 shows map generator 110 and location calculator 120, as different components. However, map generator 110 and location calculator 120, may be implemented in the same computing system. For example, all elements in mapping system 105 may be embodied in a single server. Alternatively, map generator 110 and location calculator 120 may be located in different portions of system 100 to improve communication flows. For example, when location calculator 120 is not implemented as part of client device 150 but a user desires to minimize latency, location calculator 120 may be implemented in an edge server of mapping system 105 while map generator 110, which may be accessed less frequently, may be placed in a back-end server of mapping system 105.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s). Further, network 170 may include a network of network, coordinating communication through several networks.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
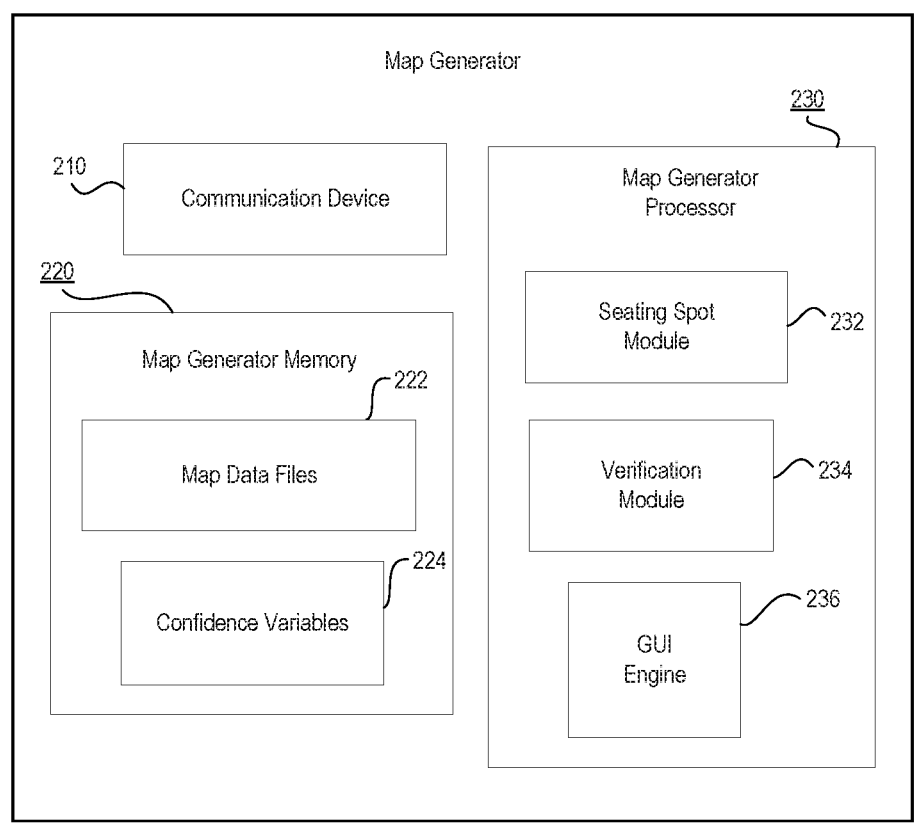
FIG. 2 is a block diagram of an exemplary map generator, consistent with disclosed embodiments.

FIG. 2 shows a block diagram of an exemplary map generator 110, consistent with disclosed embodiments. Map generator 110 may include a communication device 210, a map generator memory 220, and one or more map generator processors 230. Map generator memory 220 may include map data files 222 and confidence variables 224. Map generator processors 230 may include a seating spot management module 232, a verification module 234, and a GUI engine 236.

In some embodiments, map generator 110 may take the form of a server, a general-purpose computer, a mainframe computer, or any combination of these components. In other embodiments, map generator 110 may be a virtual machine. In yet other embodiments, operations and functions described for map generator 110 may be implemented by client devices 150 and processing units in client devices 150. Other implementations consistent with disclosed embodiments are possible as well.

Communication device 210 may be configured to communicate with one or more databases, such as database 180 described above, either directly, or via network 170. In particular, communication device 210 may be configured to receive locations of users or elements from location calculator 120. Map generator 110 may use this information to identify elements in a map and generate updated GUIs for client devices 150. In addition, communication device 210 may be configured to communicate with other components as well, including, for example, online resources 140.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Map generator memory 220 may include one or more storage devices configured to store instructions used by map generator processors 230 to perform functions related to disclosed embodiments. For example, map generator memory 220 may store software instructions to perform operations when executed by map generator processors 230. The disclosed embodiments are not limited to separate programs or computers configured to perform dedicated tasks. For example, while in some embodiments map generator memory 220 may include a single program that performs the functions of map generator 110, in other embodiments map generator memory 220 may include multiple programs. Map generator memory 220 may also store map data files 222. As previously discussed in connection with FIG. 1, map data files may be in digital mapping formats such as Shapefile (i.e., .ship, .shx .dbf), Keyhole markup (i.e., KML and KMX), and or GPS formats (e.g., GPX and GPI). Map generator memory 220 may include multiple map data files 222, each map data file being associated with a venue, such as an entertainment venue or an office space, and each one of map data files 222 may include information of seating spots and context clues.

Further, map generator memory 220 may include confidence variables 224, where map generator memory 220 may store confidence values associated with spots in maps. For example, as further described in connection with FIG. 6, each spot in map data files 222 may be associated with a confidence level. A confidence level may be used to determine whether the associated spot should be displayed in GUI's of the map, or if the spot should be removed. Further, the confidence level may be used to determine the intensity with which a spot is displayed on a GUI. The greater the confidence level, the more certainty a spot is available and thus, to call attention of users of GUIs, the associated spot may be displayed with greater intensity. In some embodiments, these confidence levels may be stored in confidence variables 224. Confidence variables 224 may include accumulation variables of integers, strings, or floating points. Additionally, or alternatively, confidence variables 224 may include O(1) complexity variables, which can be accessed in constant times. Such variables may facilitate confidence level calculations to determine whether or not a map should be updated.

In certain embodiments, map generator memory 220 may store sets of instructions for carrying out processes to generate map data file patches and/or generate instructions to display GUIs, described below in connection with FIGS. 14-18. Other instructions are possible as well. In general, instructions may be executed by map generator processors 230 to perform processes consistent with disclosed embodiments.

In some embodiments, map generator processors 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, map generator processors 230 may be a plurality of devices coupled and configured to perform functions consistent with the disclosure.

In some embodiments, map generator processors 230 may execute software or firmware to perform functions associated with each component of map generator processors 230. In other embodiments, each component of map generator processors 230 may be an independent device. In such embodiments, each component may be a hardware device configured to specifically process data or perform operations associated with modeling hours of operation, generating identification models and/or handling large data sets. For example, seating spot management module 232 may be a field-programmable gate array (FPGA), GUI engine 236 may be a graphics processing unit (GPU), and verification module 234 may be a central processing unit (CPU). Other hardware combinations are also possible. In yet other embodiments, combinations of hardware and software may be used to implement map generator processors 230.

Seating spot management module 232 may determine whether or not a spot should be added or removed. For example, based on user-collected information and associated confidence levels, stored in confidence variables 224, seating spot management module 232 may add a spot or remove a spot. Further, seating spot management module 232 may perform operations to determine coordinates in a map for a spot. Based on location data, received from location calculator 120, for example, seating spot management module 232 may determine the location of spots in a map data file. Moreover, seating spot management module 232 may be configured to update or manipulate map data files 222.

In some embodiments, seating spot management module 232 may also determine an intensity with which spots will be displayed on a GUI. For example, seating spot management module 232 may determine display intensity of spots based on confidence levels associated with confidence variables 224.

Verification module 234 may perform operations to determine whether to update map data files based on new information. In some embodiments, client devices 150 may request changes to map data files. For example, client devices 150 may initiate a request to add a spot. Verification module 234 may be configured to evaluate the requests and determine whether to modify the map data files and/or update map generator memory 220. For example, as further discuss in connection to FIG. 10, client requests for modifications may be verified by comparing them with previous client requests. Alternatively, or additionally, client requests may be verified using verification data. For example, verification data may include pictures, a user credibility rating, and/or location data. Verification module 234 may be configured to evaluate the different sources of verification and decide as to the validity of client requests.

GUI engine 236 may generate user interfaces for client devices 150. GUI engine 236 may generate GUIs for different operating systems, such as iOS® or Android®, that include information from map data files 222. For example, GUI engine 236 may combine Swing, JavaFX, SWT in a single and/or generate multiple windows with different functionality and buttons, as further discussed in connection with FIGS. 14-18. GUI engine 236 may also embed components in instructions for display interfaces in client devices. For example, GUI engine 236 may integrate Java applications by use of embedded browsers, e.g. JavaFX's WebView component of JxBrowser.

Moreover, in some embodiments GUI engine 236 may handle recording and replay of GUI toolkit threads. In some embodiments, GUI engine 236 may be segregated in multiple GUIs. For example, by creating multiple instances of the SWT Display class. In such embodiments, each engine in GUI engine 236 may be identified by a token for the GUI for AWT/Swing, JavaFX and SWT. Further, GUI engine 236 may be configurable to generate dynamic map data files in which GUI engine 236 may provide interactive tools for navigation and/or measuring distances.

GUI engine 236 may be implemented by map generator processor 230. For example, map generator processor 230 may execute software in memory 220 to create an environment to execute models from location calculator 120. However, in other embodiments GUI engine 236 may include hardware devices configured to carry out parallel operations. Some hardware configurations may improve the efficiency of generating GUI's, particularly when multiple client devices 150 require different map data files or request different type of functionalities. For example, GUI engine 236 may include multicore processors or computer clusters to divide tasks and quickly generate GUIs.

The components of map generator 110 may be implemented in hardware, software, or a combination of both, as will be apparent to those skilled in the art. For example, although one or more components of map generator 110 may be implemented as computer processing instructions embodied in computer software in memory 220, some or all of the functionality of map generator 110 may be implemented in dedicated hardware. For instance, groups of GPUs and/or FPGAs maybe used to quickly analyze data in map generator processors 230. Further, components of map generator 110 may be implemented within client devices 150. For example, processors in client devices 150 may implement GUI engine 236 operations.

Figure 3:
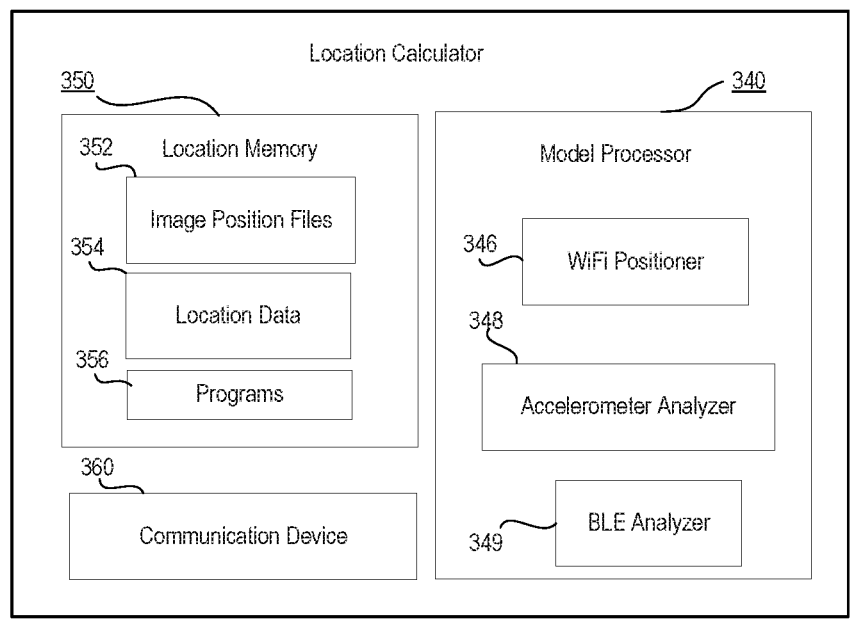
FIG. 3 is a block diagram of an exemplary location calculator, consistent with disclosed embodiments.

Referring now to FIG. 3, there is shown a block diagram of an exemplary location calculator 120, consistent with disclosed embodiments. Location calculator 120 may include a location processor 340, a location memory 350, and a communication device 360.

Location processor 340 may be embodied as a processor similar to map generator processors 230. Location processor 340 may include a WiFi positioner 346, an accelerometer analyzer 348, and a BLE analyzer 349.

WiFi positioner 346 may be implemented in software or hardware configured to estimate or adjust a location based on WiFi signals. WiFi positioner 346 may include processors that use information of Wi-Fi hotspots and other wireless access points to estimate a location. In some embodiments, WiFi positioner 346 may adjust GPS signals based on location of WiFi hotspots. In such embodiments, WiFi positioner 346 may determine locations determining the intensity of received signals (received signal strength indication or RSSI). For example, WiFi positioner 346 may employ parameters to geolocate wireless access points such as Service Set Identifier (SSID) and MAC address. Once the WiFi characteristic information is discovered, WiFi positioner 346 may correlate mobile device GPS location data with Wi-Fi hotspot MAC addresses to determine a location. Moreover, in some embodiments WiFi positioner 346 may merge Wi-Fi traces (i.e., information characteristic of WiFi logins or records) with other data sources such as geographical information and time constraints (i.e., time geography).

WiFi positioner 346 may be configured to perform techniques such as RSSI and lateration. In such embodiments, WiFi positioner 346 may perform RSSI localization techniques based on measuring signal strength from a client device to several different access points, and then combine this information with a propagation model to determine the distance between the client device and the access points. WiFi positioner 346 may also perform WiFi trace fingerprinting location operations. In such embodiments, WiFi positioner 346 may rely on the recording of the signal strength from several access points in range and storing this information in a database along with the known coordinates of the client device in an offline phase. Further, WiFi positioner 346 may use angle of arrival techniques for positioning, in which WiFi positioner 346 may estimate angles of multipath signals and apply triangulation to calculate the location of client devices. Alternatively, or additionally, WiFi positioner 346 may employ time of flight (ToF) based techniques to estimate locations. In such embodiments, WiFi positioner 346 may take timestamps provided by wireless interfaces to calculate the ToF of signals and then use this information to estimate the distance and relative position of one client device with respect to access points. In certain embodiments, WiFi positioner 346 may combine one or more of the previously described techniques to estimate a location based on WiFi signals.

Accelerometer analyzer 348 may be implemented in software, hardware, or a combination thereof configured to estimate or adjust a location based on accelerometer and gyroscope signals. For example, accelerometer analyzer 348 may derive velocity and location based on records of accelerometer and gyroscopes. In such embodiments, accelerometer analyzer 348 may initially extract inertial frame acceleration based on sensor information. Then, accelerometer analyzer 348 may estimate velocity and position by integrating the inertial frame acceleration. Accelerometer analyzer 348 may also make orientation estimations based on historic acceleration data and other positioning systems, such as GPS. Furthermore, in certain embodiments, accelerometer analyzer 348 may include a Kalman filter to combine data from accelerometers and gyroscopes.

BLE analyzer 349 may be implemented in software, hardware, or a combination thereof configured to estimate or adjust a location based on BLE signals. In some embodiments, BLE analyzer 349 may be configured to collect and interpret a plurality of beacon BLE signals. In some embodiments, BLE analyzer 349 may employ geo-fence or micro-fence solutions to approximate indoor locations. Further, BLE analyzer 349 may link BLE signals with specific places and locations within places for micro-mapping. In such embodiments, BLE analyzer 349 may support one or more beacon protocols to evaluate data from users to establish location based on devices such as iBeacon, AltBeacon, URIBeacon, or Eddystone. Alternatively, or additionally, BLE analyzer 349 may employ Near Field Communication (NFC) signals in making location determinations.

Location memory 350 may include one or more storage devices configured to store instructions used by location processor 340 to perform operations related to disclosed embodiments. For example, location memory 350 may store software instructions as programs 356 that may perform operations when executed by location processor 340.

Location memory 350 may include image position files 352 that may be used by location calculator 120 to determine a position based on images. For example, location calculator 120 may receive images, captured by imaging devices such as cameras in client devices 150, as part of verification data in client requests. Location memory 350 may then use image position files 352 to determine if the received image corresponds with one of the images in image position files 352. For example, location calculator 120 may determine whether two images are from the same place based on identifying context clues in both images. In such embodiments, image position files 352 may include a plurality of images from different places that have been mapped and are stored in map data files 222 (FIG. 2).

Location memory 350 may also include location data 354. As previously discussed, location processor 340 may use historic data to estimate calculations. For example, location processor 340 may estimate a location based on historic WiFi records. For such embodiments, customer-associated information may be stored in location data 354. Moreover, location data 354 may store location of spots and/or location of places with their respective mapping layout.

In certain embodiments, location memory 350 may store sets of instructions for carrying out processes to estimate locations, further described below in connection with FIG. 12.

Figure 4:
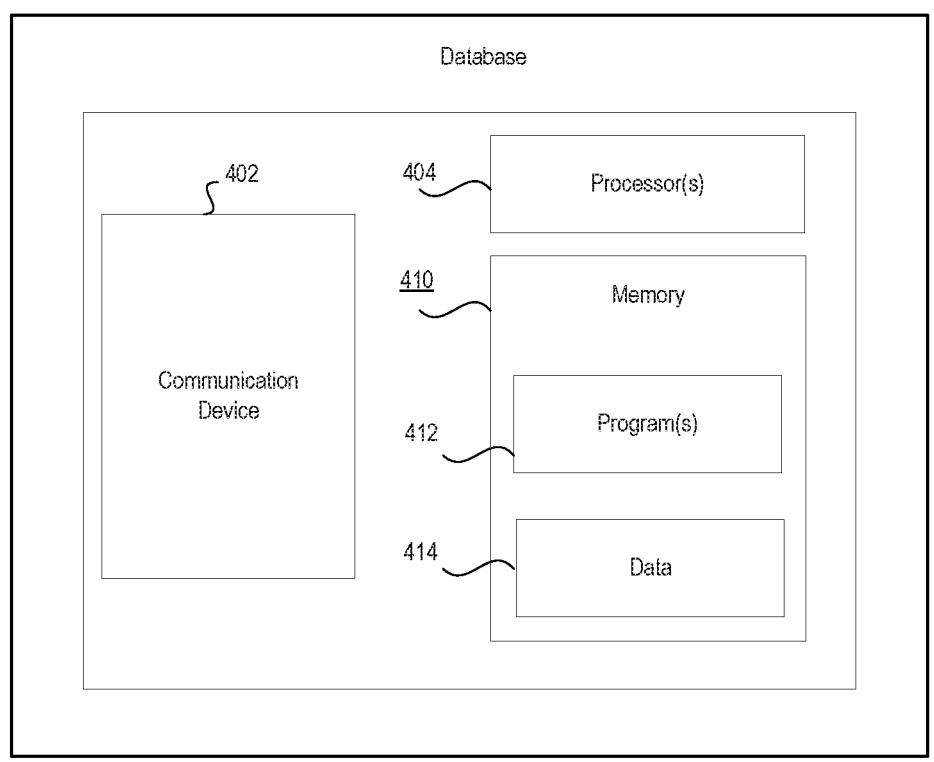
FIG. 4 is a block diagram of an exemplary database, consistent with disclosed embodiments.

Referring now to FIG. 4, there is shown a block diagram of an exemplary database 180 (FIG. 1), consistent with disclosed embodiments. Database 180 may include a communication device 402, one or more database processors 404, and a database memory 410 including one or more database programs 412 and data 414.

In some embodiments, database 180 may take the form of servers, general-purpose computers, mainframe computers, or any combination of these components. Other implementations consistent with disclosed embodiments are possible as well.

Communication device 402 may be configured to communicate with one or more components of system 100, such as online resources 140, mapping system 105, location calculator 120, map generator 110, and/or client devices 150. In particular, communication device 402 may be configured to provide map data files or user information to location calculator 120 and map generator 110. Communication device 402 may be configured to communicate with other components as well, including, for example, image position files 352 (FIG. 3). Communication device 402 may take any of the forms described above for communication device 210 (FIG. 2).

Database processors 404 and database memory 410 may take any of the forms described above for map generator processors 230 and map generator memory 220 respectively, in connection with FIG. 2. The components of database 180 may be implemented in hardware, software, or a combination of both hardware and software. For example, although one or more components of database 180 may be implemented as computer processing instruction modules, all or a portion of the functionality of database 180 may be implemented instead in dedicated electronics hardware.

Data 414 may be data associated with websites, such as online resources 140. Data 414 may include, for example, information relating venues and offices, including their geographical information, general layout, and key context element for geographic identification, such as nearby streets or landmarks. Data 414 may include map data files and information relating seating arrangements.

Figure 5:
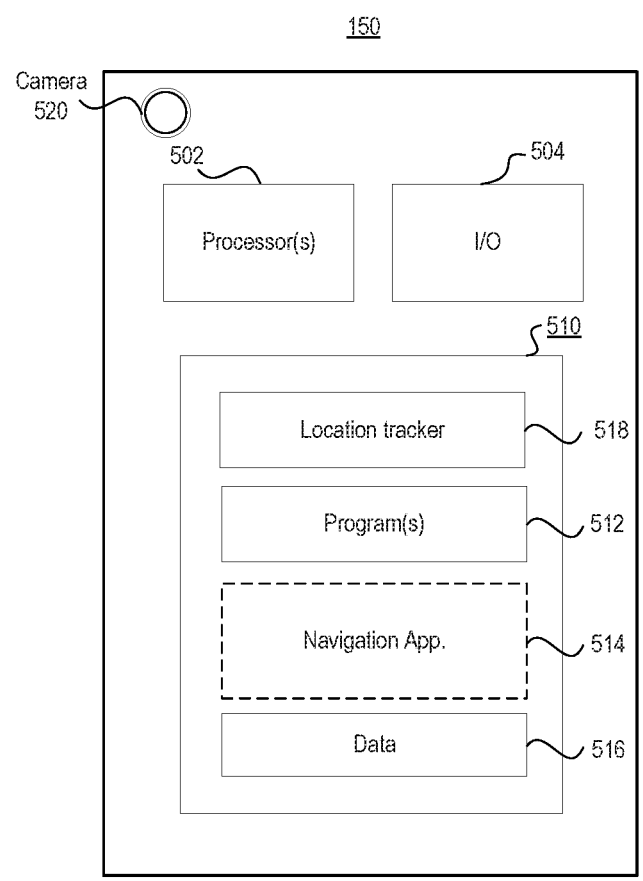
FIG. 5 is a block diagram of an exemplary client device, consistent with disclosed embodiments.

Referring now to FIG. 5, there is shown a block diagram of an exemplary client device 150 (FIG. 1), consistent with disclosed embodiments. In one embodiment, client device 150 may include one or more processors 502, one or more input/output (I/O) devices 504, one or more memories 510, and an imaging device such as a camera 520. In some embodiments, client device 150 may take the form of a mobile computing devices such as a smartphone or tablet, a general-purpose computer, or any combination of these components. Further, client device 150 may take the form of a wearable device, such as smart glasses or a smartwatch. Alternatively, client device 150 (or systems including client devices 150) may be configured as a particular apparatus, embedded systems, dedicated circuit, and the like based on the storage, execution, and/or implementation of the software instructions that perform one or more operations consistent with the disclosed embodiments. According to some embodiments, client device 150 may include a web browser or similar application that can access websites consistent with disclosed embodiments.

Processor 502 may include one or more known processing devices, such as mobile device microprocessors manufactured by Intel™, NVIDIA™, or various processors from other manufacturers. The disclosed embodiments are not limited to any specific type of processor configured in client device 150.

Memory 510 may include one or more storage devices configured to store instructions used by processor 502 to perform functions related to disclosed embodiments. For example, memory 510 may be configured with one or more software instructions, such as programs 512 that may perform operations when executed by processor 502. The disclosed embodiments are not limited to separate programs or computers configured to perform dedicated tasks. For example, memory 510 may include a single program 512 that performs the functions of the client device 150, or program 512 may include multiple programs. Memory 510 may also store data 516 that is used by one or more programs 312 (FIG. 3).

Memory 510 may include instructions to transmit locations and generate GUIs with interactive digital maps. For example, memory 510 may store instructions that configure processor 502 to send WiFi or accelerometer historic information for indoor locations and to generate GUIs to display interactive digital maps. Memory 510 may also include instructions to generate GUIs for sending feedback to mapping system 105. For example, memory 510 may include instructions to generate a GUI that allows users to describe where a seating spot should be indicated in the map. As further disclosed in connection with FIG. 14, such GUIs may include interactive icons and the functions or operations of the interactive icons may be stored in memory 510.

In certain embodiments, memory 510 may store a navigation application 514 that may be executed by processor(s) 502. In certain aspects, navigation application 514, or another software component, may be configured to generate and transmit request for servers to request map data files. Further, navigation application 514 may include metafiles with information about places, the user of client devices, and their related attributes. Moreover, navigation application 514 may be modifiable or updatable with patches received from other elements of system 100. For example, when mapping system 105 issues a patch for map data file, navigation application 514 may run the patch to update GUIs and/or maps in the application. In addition, navigation application 514 may perform operations of generating icons to modify GUI(s) in client device 150.

Navigation application 514 may also configure processor(s) 502 to communicate with mapping system 105 or determine the location of client devices 150. For instance, through navigation application 514, client devices 150 may communicate feedback to update maps to mapping system 105. For example, navigation application 514 may generate HTTP requests or other TCP/IP packets directed to mapping system 105 with user-collected information or requests. Alternatively, or additionally, navigation application 514 may generate queries for mapping system 105 to get, for example, map data files. In such embodiments, navigation application 514 may also include instructions that configure processor(s) 502 to generate GUIs based on responses or communications from other elements of system 100. For example, navigation application 514 may include instructions to generate GUIs based on results obtained from servers.

Additionally, navigation application 514 may store instructions to compress or decompress map data files. In some embodiments, map data files may be exchanged between client device 150 and other elements of system 100, as disclosed in connection to FIG. 13. For example, when transmitting feedback for a map data file, client device 150 may send an image with metadata from camera 520 to mapping system 105. When there are limited bandwidths for network 170, like in cellular networks, images exchanges may be expensive or slow. To improve the system 100, navigation application 514 may perform compression and decompression of images to reduce the size of files being exchanged over network 170.

I/O devices 504 may include one or more devices configured to allow data to be received and/or transmitted by client devices 150 and to allow client devices 150 to communicate with other machines and devices, such as other components of system 100. For example, I/O devices 504 may include a screen for displaying optical payment methods such as Quick Response Codes (QR) or providing information to the user. I/O devices 504 may also include components for NFC communication. I/O devices 504 may also include one or more digital and/or analog devices that allow a user to interact with client devices 150 such as a touch-sensitive area, buttons, or microphones. I/O devices 504 may also include one or more accelerometers to detect the orientation and inertia of client device 150. I/O devices 504 may also include other components known in the art for interacting with mapping system 105.

The components of client device 150 may be implemented in hardware, software, or a combination of both hardware and software.

Figure 6:
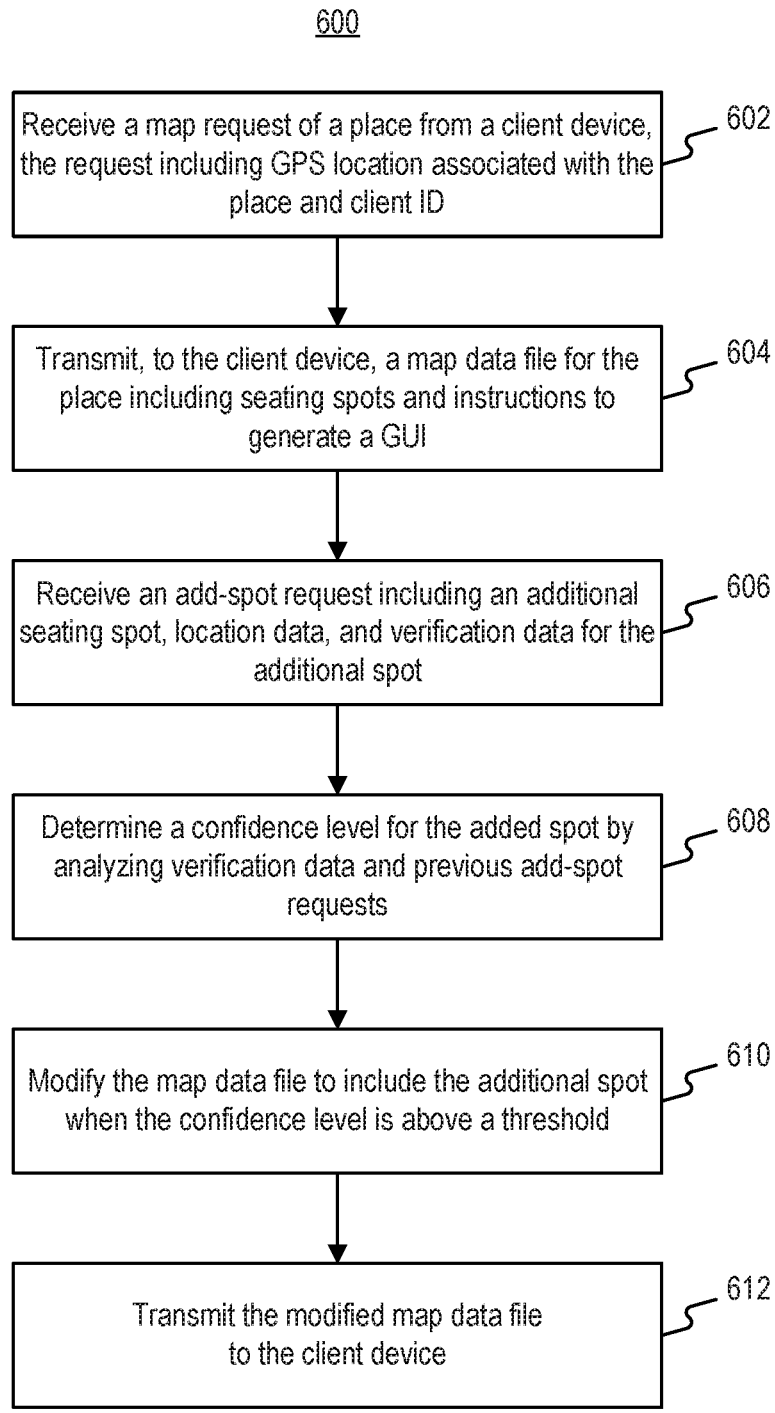
FIG. 6 is a flow chart illustrating an exemplary process for generating and transmitting a map data file, consistent with disclosed embodiments.

Referring now to FIG. 6, there is shown a flow chart illustrating an exemplary process 600 for generating and transmitting a map data file, consistent with disclosed embodiments. In some embodiments, process 600 may be executed by mapping system 105. For example, map generator 110 may perform steps in process 600, generate GUIs, and communicate them to client devices 150. Further, as previously discussed in connection to FIG. 1, in some embodiments process 600 may be performed by multiple elements of system 100. For example, some steps of process 600 may be performed by mapping system 105, while other steps of process 600 may be performed by client devices 150.

The description below of steps in process 600 illustrates an embodiment in which mapping system 105 performs steps of process 600. However, as previously discussed, other elements of system 100 may also be configurable to perform one or more of the steps in process 600. For example, online resources 140 may perform one or more steps of process 600.

In step 602, mapping system 105 may receive a map request. The request may be a request for a map of a venue, and may come from one or more of client devices 150 and/or from online resources 140. The request may be an HTTP request or a different type of TCP/IP communication, such a URL request, or other general type of internet communication of a place, such as a venue or an office building. The request may also include information associated with the user of client devices 150 generated the request. For instance, the request may include a client ID and authentication credentials. In some embodiments, the request may also include a confidence level indicator associated with the client ID. For example, a user that frequently sends updating data to the mapping system 105 may be associated with a higher confidence level than a user that has requested a map for the first time. Thus, the request in step 602 may include a confidence level associated with the customer.

In step 604, mapping system 105 may transmit, to one or more of client devices 150, a map data file for the place requested in step 602. The map data file may include data representing spots, and instructions to generate a GUI. The instructions to generate a GUI may include instructions to generate a GUI including information of the map data file. Moreover, as further discussed in connection to FIG. 14, the instructions may include information to display icons associated with feedback or requests to mapping system 105. In some embodiments, mapping system 105 may determine a relevant radius based on the first location data and the map data file in step 604. Further, based on the relevant radius, mapping system 105 may crop the map data file to an area that matches the relevant radius and generate a compressed map data file by compressing the map data file.

In step 606, mapping system 105 may optionally receive a request from one or more of the client devices 150. For example, mapping system 105 may receive an add-spot request that includes additional spot information. A user in a venue may notice that a seat he sees available is not showing up in the map received from mapping system 105. Thus, in step 606 a user may send a request to add an additional spot to the map. For example, through GUIs, such as the one described in connection with FIG. 15, a user may send an add-spot request in step 606. The request received in step 606 may include information about the additional spot, location data for the additional spot, and verification data for the additional spot. In some embodiments, the verification data may include an image of the spot and a confirmation of the device location.

In step 608, mapping system 105 may determine a confidence level for the added spot. For example, mapping system 105 may analyze verification data received in step 606 to assign a confidence level. Additionally, or alternatively, mapping system 105 may review previous add-spot requests to determine the confidence levels. If multiple add-spot requests have been received for the same or similar spot, then mapping system 105 may assign a high confidence level. However, if this is the first time a spot is being added in the location and no additional add-spot requests have been received for the spot, mapping system 105 may assign a low confidence level. In some embodiments, mapping system 105 may read confidence variables 224 (FIG. 2) when determining a confidence level for the added spot. For example, rather than reviewing all previous transactions, mapping system 105 may update the confidence levels stored in confidence variables 224 to determine an updated confidence level.

In step 610, mapping system 105 may modify the map data file to include the additional spot requested in step 606 when the confidence level, determined in step 608, is above a threshold value. In some embodiments, mapping system 105 may accept a new spot when at least three users have independently requested that a spot be added for that area. In such embodiments confidence variables 224 may include an integer counter that counts the number of add-spot requests. When a threshold number of, for example, three add-spot requests is received for the spot, mapping system 105 may determine the confidence level is above the threshold (of number of requests equal to three) and modify the map data file sent in step 604 to include the new spot. Modifying the map may include changing source code of the map data file to include a new spot. Alternatively, or additionally, modifying the map may include contacting an API of a database, such as database 180, to modify the map data file. Further, modifying the map may include creating a patch file that modifies the map data file and/or GUIs presented in client devices 150.

In step 612, mapping system 105 may transmit the modified map data file to client devices 150. Alternatively, or additionally, mapping system 105 may transmit a patch to modify the map data file to the client devices 150. Further, in some embodiments, mapping system 105 may perform compression operation of the map data file to send it through networks with limited bandwidth.

Figure 7:
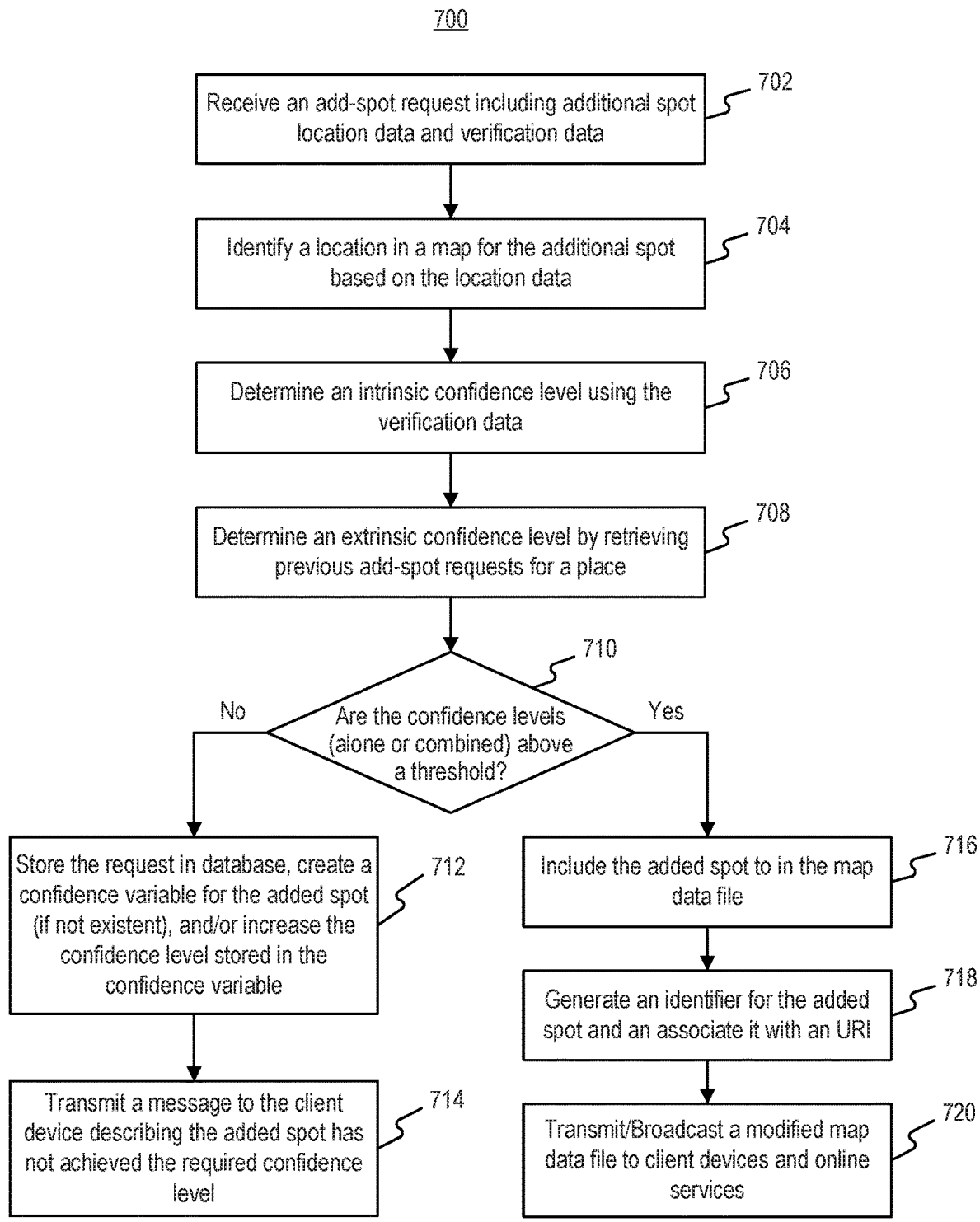
FIG. 7 is a flow chart illustrating an exemplary process for handling an add-spot request, consistent with disclosed embodiments.

Referring now to FIG. 7, there is shown a flow chart illustrating an exemplary process 700 for handling a add-spot request, consistent with disclosed embodiments. In some embodiments, process 700 may be executed by mapping system 105. For example, map generator 110 in conjunction with location calculator 120 may perform steps in process 600, generate GUIs, and communicate them to client devices 150. Further, in some embodiments process 700 may be performed by multiple elements of system 100. For example, some steps of process 700 may be performed by mapping system 105, while other steps of process 700 may be performed by client devices 150.

The description below of steps in process 700 illustrates an embodiment in which mapping system 105 performs steps of process 700. However, other elements of system 100 may also be configurable to perform one or more of the steps in process 700.

In step 702, mapping system 105 may receive an add-spot request including additional spot location data and verification data. The add-spot request may include an HTTP request or a general TCP or UDP communication. In certain embodiments, where the place associated with the requested map is an office building, the add-spot request includes a request for a plurality of consecutive additional spots and a description of a location of the consecutive additional spots.

In step 704, mapping system 105 may identify a location in a map for the additional spot based on the location data received in step 702. For example, after receiving the add-spot request, mapping system 105 may identify a map data file associated with the request. Based on location and verification data, mapping system 105 may then identify a location for the add-spot request in the map data file.

In step 706, mapping system 105 may determine an intrinsic confidence level using the verification data. For example, the add-spot request may include verification data such as an image, location information of client devices 150, and/or a description of the location. These elements may be computed by mapping system 105 into an intrinsic confidence level. This intrinsic confidence level may be stored in confidence variables 224 (FIG. 2).

In step 708, mapping system 105 may determine an extrinsic confidence level that is based on accumulated requests. For example, mapping system 105 may retrieve previous add-spot requests for a place. Mapping system 105 may then compare the requests and generate an extrinsic confidence level based on the number of matching requests. Alternatively, as discussed in connection with FIG. 6, the extrinsic confidence value may be based on accumulation variables that accumulate the number of request. For example, the extrinsic confidence level may be determined based on O(1) variables such as integers and accumulators. In such embodiments, the threshold may be determined based on a system of points. For example, each associated add-on request gives 20 points and each piece of verification data gives 10 points. Then, if a confidence level reaches one hundred points, the spot is added to the map.

In step 710, mapping system 105 may determine whether the confidence levels are above a threshold. The determination may be done for extrinsic and intrinsic confidence values separately, or for combined extrinsic and extrinsic levels. For example, the determination may be based on the number of points or in the number of requests.

If mapping system 105 determines the confidence level is not above the threshold (step 710: No), mapping system 105 may continue to step 712. In step 712 mapping system 105 may store the request in database, create a confidence variable in confidence variables 224 (FIG. 2) for the added spot (if not existent), and/or increase the confidence level stored in the confidence variable. Further, in step 714, mapping system 105 may transmit a message to client devices 150 that sent the request. The message to client devices 150 may describe the added spot has not achieved the required confidence level and will not be displayed.

If, however, mapping system 105 determines the confidence level is above the threshold (step 710: Yes), mapping system 105 may continue to step 716. In step 716, mapping system 105 may include the added spot to the map data file. For example, mapping system 105 may modify the map data file to include the data spot or may generate a patch file to modify the map data file and the GUI. Further, in step 718, mapping system may generate an identifier for the added spot and associate it with a URI that may encode a spot ID and an intensity for the spot, which may be associated with the confidence level.

In step 720, mapping system 105 may transmit and/or broadcast the map as modified in step 716, with the added spot. For example, mapping system 105 may transmit the modified map data file to client devices 150 that requested changes. Alternatively, or additionally, mapping system 105 may broadcast the modified map data file to all client devices in the network. Further, in some embodiments mapping system 105 may transmit or broadcast patches for map data files in step 720.

Figure 8:
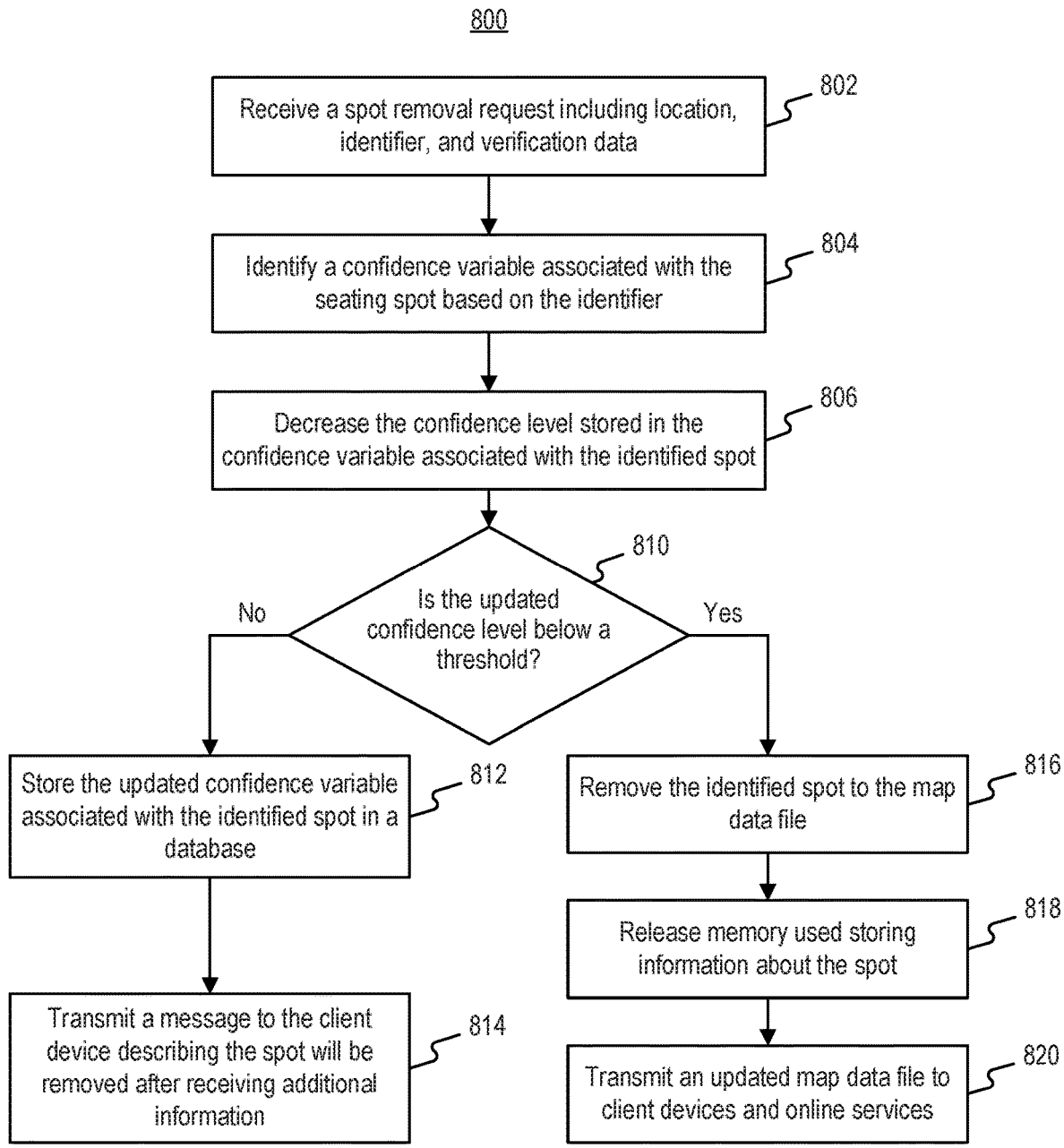
FIG. 8 is a flow chart illustrating an exemplary process for handling a remove-spot request, consistent with disclosed embodiments.

Referring now to FIG. 8, there is shown a flow chart illustrating an exemplary process 800 for handling a remove-spot request, consistent with disclosed embodiments. In some embodiments, process 800 may be executed by mapping system 105. For example, map generator 110 may perform steps in process 800, generate GUIs, and communicate with client devices 150. In other embodiments, however, process 800 may be performed by client devices 150. For example, processor(s) 502 in client devices 150 may execute instructions in navigation application 514 (FIG. 5) to perform process 800.

The description below of steps in process 800 illustrates an embodiment in which mapping system 105 performs steps of process 800. However, as previously discussed other elements of system 100 may also be configurable to perform one or more of the steps in process 800.

In step 802, mapping system 105 may receive a spot removal request from one or more of client devices 150. The spot removal request may be an HTTP request. In some embodiments, the spot removal request may include a spot location, a spot identifier, and verification data. For example, the request received in step 802 may include a coordinate location and an identifier of the spot that should get removed. Further, the spot removal request may include verification data such as pictures showing that the spot is inexistent or a description of why the spot is inexistent.

In step 804, mapping system 105 may identify a confidence variable associated with the seating spot. For example, based on the identifier associated with the request, mapping system 105 may identify a seating spot in a map data file and its associated confidence variable in confidence variables 224 (FIG. 2).

In step 806, because the request is for removal of the spot, mapping system 105 may decrease the confidence level that is stored in the confidence variable associated with the identified spot. In some situations, mapping system 105 may try to remove spots only when there is a consensus that the seating spot is not available to prevent overloading the system and prevent misinformation. Therefore, instead of immediately removing a spot based on a removing request, mapping system 105 may modify confidence levels and remove spots only if they fall below the confidence value. Thus, in step 806 mapping system 105 may decrease the confidence level. Alternatively, in certain embodiments, mapping system 105 may establish stricter protocols that any removal request results in a spot removal.

In step 810, mapping system 105 may determine whether the updated confidence level (updated in step 806) is below a threshold. For example, mapping system 105 may determine whether the confidence level fell below a confidence threshold after deducting points or number of request in step 806.

If mapping system 105 determines that the update confidence value is not below a threshold (step 810: No), mapping system 105 may continue to step 812 and store the updated confidence level in the corresponding confidence variable associated with the identified spot in a database. Further, in step 814, mapping system 105 may transmit a message to client device 150 describing the spot has not been removed because the confidence level did not fall below the threshold. The message may also include an alert indicating that the spot will be removed after receiving additional information. In such embodiments, mapping system 105 may generate GUIs that ask users of client devices 150 to provide additional verification information, such as images or written descriptions.

If, however, mapping system 105 determines that the update confidence value is below a threshold (step 810: Yes), mapping system 105 may continue to step 816. In step 816, mapping system 105 may update the map data file to remove the identified spot. For example, mapping system 105 may modify the map data file source to delete the spot. Alternatively, or additionally, mapping system 105 may communicate through APIs to remove spots or generate executable patches that modify map data files or mapping system 105 may generate patches removing the spot. Further, in step 818 mapping systems 105 may release memory storing information associated with the removed spot. For example, stored information associated with the removed spot may be deleted from map generator memory 220 (FIG. 2).

In step 820, mapping system 105 may transmit and/or broadcast the map as modified in step 816, with the removed spot. For example, mapping system 105 may transmit the modified map data file to client devices 150 that requested changes. Alternatively, or additionally, mapping system 105 may broadcast the modified map data file to all client devices in the network. Further, in some embodiments mapping system 105 may transmit or broadcast patches for map data files in step 820.

Further, in some embodiments, mapping system 105 may perform operations such as receiving a spot removal request (the spot removal request including an identifier of a removed seating spot and the identifier comprising a coordinate), identifying a confidence variable associated with the removed seating spot based on the identifier, and decreasing a confidence level stored in the confidence variable.

Figure 9:
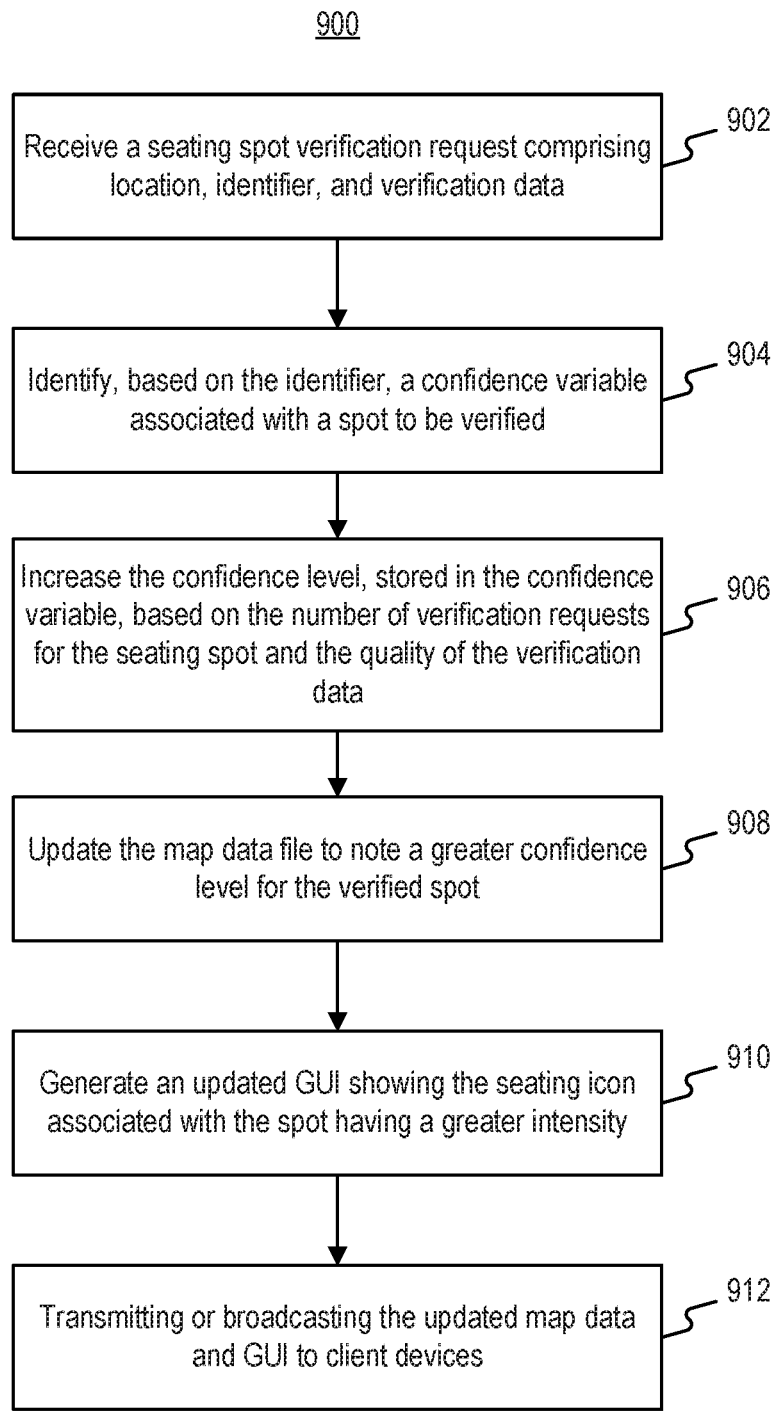
FIG. 9 is a flow chart illustrating an exemplary process for handling a spot verification request, consistent with disclosed embodiments.

Referring now to FIG. 9, there is shown a flow chart illustrating an exemplary process 900 handling a spot verification request, consistent with disclosed embodiments. In some embodiments, process 900 may be executed by mapping system 105. In other embodiments process 900 may be performed by different or multiple elements of system 100. For example, some steps of process 900 may be performed by mapping system 105, while other steps of process 900 may be performed by client devices 150.

The description below of steps in process 900 illustrates an embodiment in which mapping system 105 performs steps of process 900. However, other elements of system 100 may also be configurable to perform one or more of the steps in process 900. For example, online resources 140 may perform one or more steps of process 900.

In step 902, mapping system 105 may receive a spot verification request. The request may be and HTTP message and may be sent from one of client devices 150 when a user can verify a spot in a map is real and/or available. The request in step 902 may include location, an identifier of the spot, and verification data. Similar to the remove request discussed in step 802 (FIG. 8), the verification data in the verification request of step 902 may include pictures. Moreover, the request received in step 902 may include a coordinate location and an identifier of the spot that should be verified.

In step 904, mapping system 105 may identify a confidence variable associated with the seating spot to be verified. For example, based on the identifier associated with the request, mapping system 105 may identify a seating spot in a map data file and an associated confidence variable in confidence variables 224 (FIG. 2).

In step 906, because the request is for verifying the spot, mapping system 105 may increase the confidence level that is stored in the confidence variable associated with the identified spot. In some embodiments, the magnitude of confidence level increment may be based on the number of verification requests that have been received for the seating spot. Additionally, or alternatively, the magnitude of confidence level increment may be based on the quality of the verification data.

In step 908, mapping system 105 may update the map data file to note a greater confidence level for the verified spot. For example, mapping system 105 may modify attributes of variables in map data files to indicate the confidence level has increased.

In step 910, mapping system 105 may generate an updated GUI showing the seating icon associated with the spot having a greater intensity. For example, as a confidence level associated with a spot increases the GUI may mark the available seating spot with bigger or more intense seat icon. In such embodiments, as more users mark a given seat as available, mapping system 105 may cause the seat icon to glow brighter or greener in the GUI to indicate a high confidence level of availability.

In step 912, mapping system 105 may transmit and/or broadcast the map and GUI as modified in steps 908 and 910, with the updated confidence level (and intensity) for the verified spot. Mapping system 105 may transmit the modified map data file to client devices 150 that requested the verification. Alternatively, or additionally, mapping system 105 may broadcast the map data file with updated confidence values to all client devices in the network. Further, in some embodiments mapping system 105 may transmit or broadcast only files specifying confidence level files that may act as patches for map data files. In such embodiments, client devices 150, and navigation application 514, may include programs that read confidence level files and adjust GUIs based on the confidence level files.

Furthermore, in some embodiments, as part of process 900, mapping system 105 may perform operations of receiving a spot verification request, the spot verification request including an identifier of a verified seating spot (the identifier comprising a coordinate) and identifying a confidence variable associated with the verified seating spot based on the identifier. Moreover, mapping system 105 may increase a confidence level stored in the confidence variable.

Figure 10:
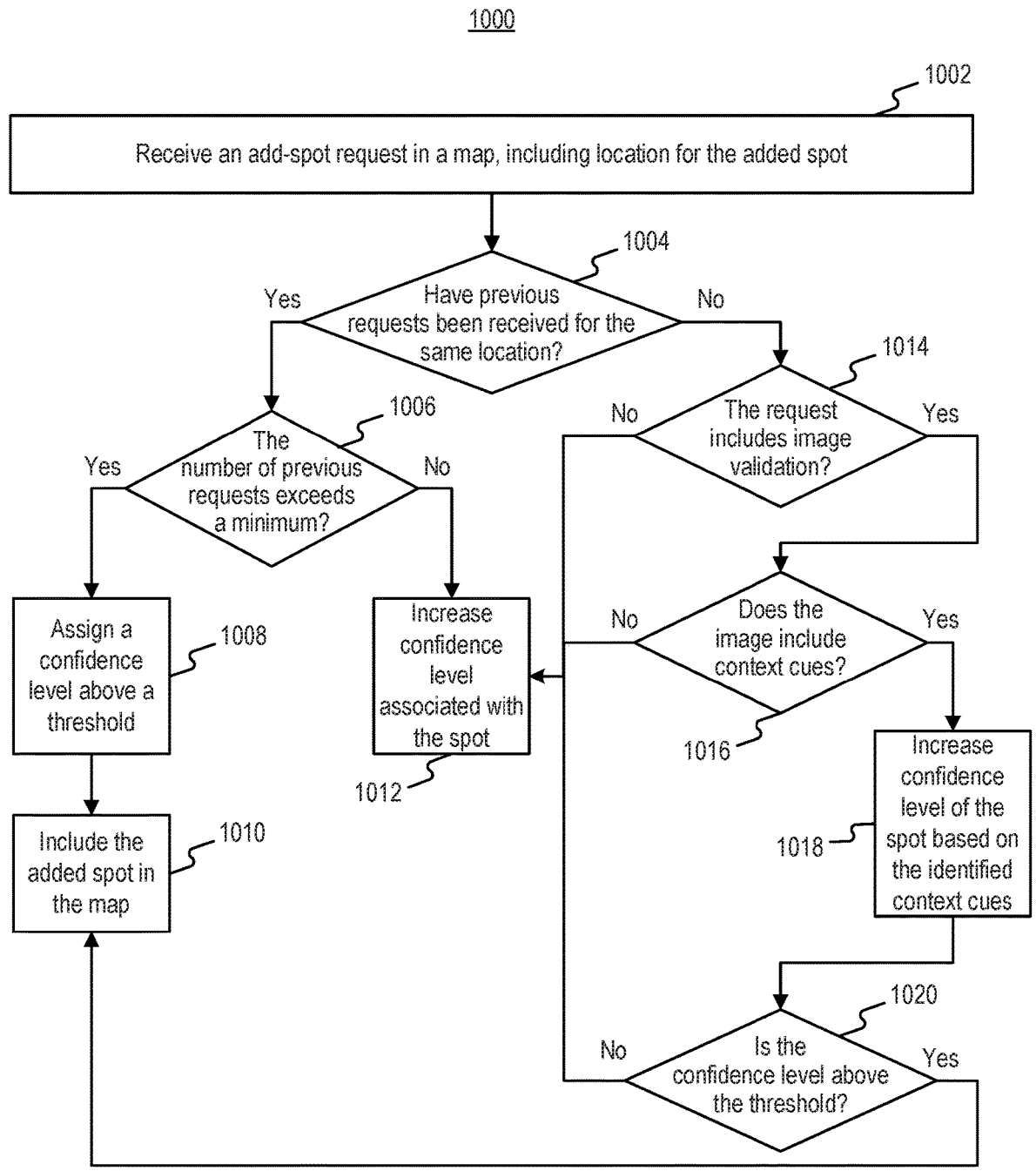
FIG. 10 is a flow chart illustrating an exemplary process for assessing confidence level of an added spot, consistent with disclosed embodiments.

Referring now to FIG. 10, there is shown a flow chart illustrating an exemplary process 1000 for assessing confidence level of an added spot, consistent with disclosed embodiments. In some embodiments, process 1000 may be executed by mapping system 105. For example, map generator 110 may perform steps in process 1000 when receiving requests from client devices 150 (FIG. 1). In other embodiments, however, one or more elements of system 100 may perform process 1000. For example, some steps of process 1000 may be performed by mapping system 105, while other steps of process 1000 may be performed by client devices 150.

The description below of steps in process 1000 illustrates an embodiment in which mapping system 105 performs steps of process 900. However, as previously discussed other elements of system 100 may also be configurable to perform one or more of the steps in process 1000.

In step 1002, mapping system 105 may receive an add-spot request. As previously discussed in step 702 (FIG. 7), the add-spot request may include a location for the added spot, verification data, and some client information.

In step 1004, mapping system 105 may determine whether there have been previous requests received for the same location. For example, mapping system 105 may determine if previous add-spot request sent similar coordinates. If mapping system 105 determines there have been previous requests with the same location (step 1004: Yes), mapping system 105 may continue to step 1006. In step 1006, mapping system 105 may determine whether the number of previous add-spot requests with the same location exceed a minimum threshold. For example, in step 1006, mapping system 105 may determine whether at least 3 or at least 5 add-spot requests have been received with the same or similar location information.

If mapping system 105 determines the minimum number of add-spot requests have been received (step 1006: Yes), mapping system 105 may continue to step 1008 and assign a confidence level for the added spot that is above a confidence threshold. For example, in step 1008 mapping system 105 may assign a confidence score above a threshold of 100 points. In step 1010, mapping system 105 may include the added spot in the map by modifying the map data file or generating a patch that updates the added spot.

If, however, in step 1006 mapping system 105 determines the number of previous request does not exceed a minimum (step 1006: No), mapping system 105 may continue to step 1012. In step 1012, mapping system 105 may increase a confidence level associated with the spot to be added according to the request received in step 1002. For example, mapping system 105 may retrieve confidence variables 224 (FIG. 2) and increase the level of the corresponding variables.

In step 1004, mapping system 105 may determine that no previous request has been received for the same location as the one received in step 1002 (step 1004: No). In such situations, mapping system 105 may continue to step 1014 and determine whether the request received in step 1002 included image validation. If the request did not include an image validation (step 1014: No), mapping system 105 may continue to step 1012 and increase a confidence level associated with the spot. However, if the request included an image validation (step 1014: Yes), mapping system 105 may continue to step 1016 and determine whether the image validation includes context clues.

If mapping system 105 determines that the image does not include context clues (step 1016: No), mapping system 105 may continue to step 1012 and increase the confidence level associated with the spot. However, if mapping system 105 determines the image includes the context clues (step 1016: yes), mapping system 105 may continue to step 1018. In step 1018, mapping system 105 may increase confidence levels of the spot based on the identified context clues. For example, if context clues match image identification of the place or venue, then mapping system 105 may increase the confidence value. In such embodiments the magnitude of the confidence level increment may be based in the number of matching context clues identified in the images. For example, if the image includes 5 context clues and all context clues match records in database 180 associated with a place, then mapping system 105 may assign a greater confidence level than if only a 2 context clues matched. Additionally, or alternatively, mapping system 105 may perform operations such as identifying context clues from the image and adjusting the confidence level based on a number of context clues identified in the image when performing data verification.

Further in step 1020, mapping system 105 may determine whether the confidence level is above the threshold. If the modifications of confidence level triggered by the add-spot request in step 1012, result in a confidence level above a threshold (step 1020: Yes), mapping system 105 may continue to step 1010, include the added spot in the map, and modify the map data file or generate a patch file. However, if mapping system 105 determines that after increasing the confidence level in step 1018 the confidence level is still not above the threshold (step 1020: No), mapping system may continue to step 1012 and increase the confidence level associated with the spot without including it in the map.

In some embodiments, as part of process 1000, mapping system 105 may perform operations such as retrieving add-spot requests associated with the venue from a database coupled with the one or more processors, determining whether a minimum number of add-spot requests has been received for the additional seating spot, and assigning a confidence level to the additional seating spot that is above the threshold when the minimum number of requests has been received for the additional seating spot.

Figure 11:
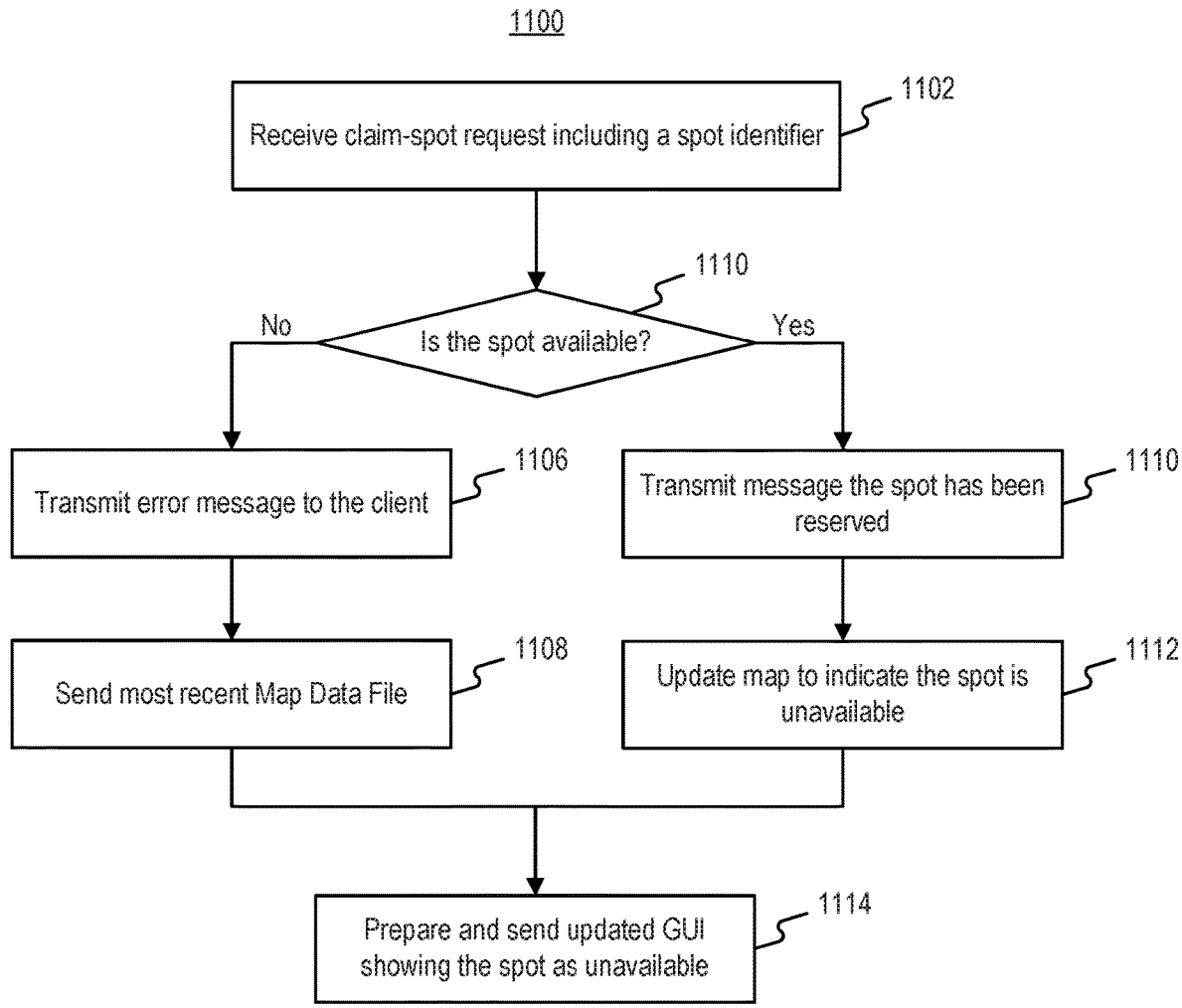
FIG. 11 is a flow chart illustrating an exemplary process for handling a claim-spot request, consistent with disclosed embodiments.

Referring now to FIG. 11, there is shown a flow chart illustrating an exemplary process 1100 for handling a claim-spot request, consistent with disclosed embodiments. In some embodiments, process 1100 may be executed by mapping system 105. For example, map generator 110 may perform steps in process 1100. In other embodiments, however, process 1100 may be performed by online resources 140. Further, in some embodiments process 1100 may be performed by multiple elements of system 100. For example, some steps of process 1100 may be performed by mapping system 105, while other steps of process 1100 may be performed by client devices 150.

The description below of steps in process 1100 illustrates an embodiment in which mapping system 105 performs steps of process 1100. However, as previously discussed, other elements of system 100 may also be configurable to perform one or more of the steps in process 1100.

In step 1102, mapping system 105 may receive a claim-spot request from one or more of client devices 150. The claim-spot request may include a spot identifier, verification data, and/or location data. In some embodiments, step 1102 may include receiving, from a client device, a claim spot request including an identifier of a requested seating spot and the identifier may include a coordinate.

In step 1110, mapping system 105 may determine whether the spot to be claimed is available. For example, mapping systems 105 may consult database 180 to determine availability of spots. If mapping system 105 determines the spot is not available (step 1110: No), mapping system 105 may continue to step 1106 and transmit an error message to client devices 150 that sent the request in step 1102. Further, mapping system 105 may continue to step 1108 and send the most recent map data file to prevent additional requests of unavailable spots.

However, if mapping system 105 determines the spot is available (step 1110: Yes), mapping system 105 may continue to step 1112 and transmit a message indicating that the spot associated with the claim-spot request is now reserved. In step 1112, mapping system 105 may also update database 180. Further, in step 1114, mapping system 105 may also update map data files to indicate the spot is unavailable.

Regardless of whether the spot is determined to be available in step 1110, in step 1116 mapping system 105 may prepare and send an updated GUI showing the spot as unavailable. For example, GUI engine 236 (FIG. 2) may generate an updated GUI that shows that claimed spot as unavailable. In such embodiments, the updated GUI may be broadcasted to all client devices 150 in the network or to client devices 150 that have been identified to be close to the place associated with the claim-spot request.

Further, for process 1100 mapping system 105 may perform operations of receiving, from a client device, a claim spot request including an identifier of a requested seating spot, the identifier including a coordinate. Mapping system 105 may also determine whether the requested seating spot is available, if the requested seating spot is determined to be unavailable, transmitting a decline message to the client device. However, if the requested seating spot is determined to be available, mapping system 105 may modify the map data file to indicate that the requested spot is currently unavailable and transmit the modified map data file to client devices.

Figure 12:
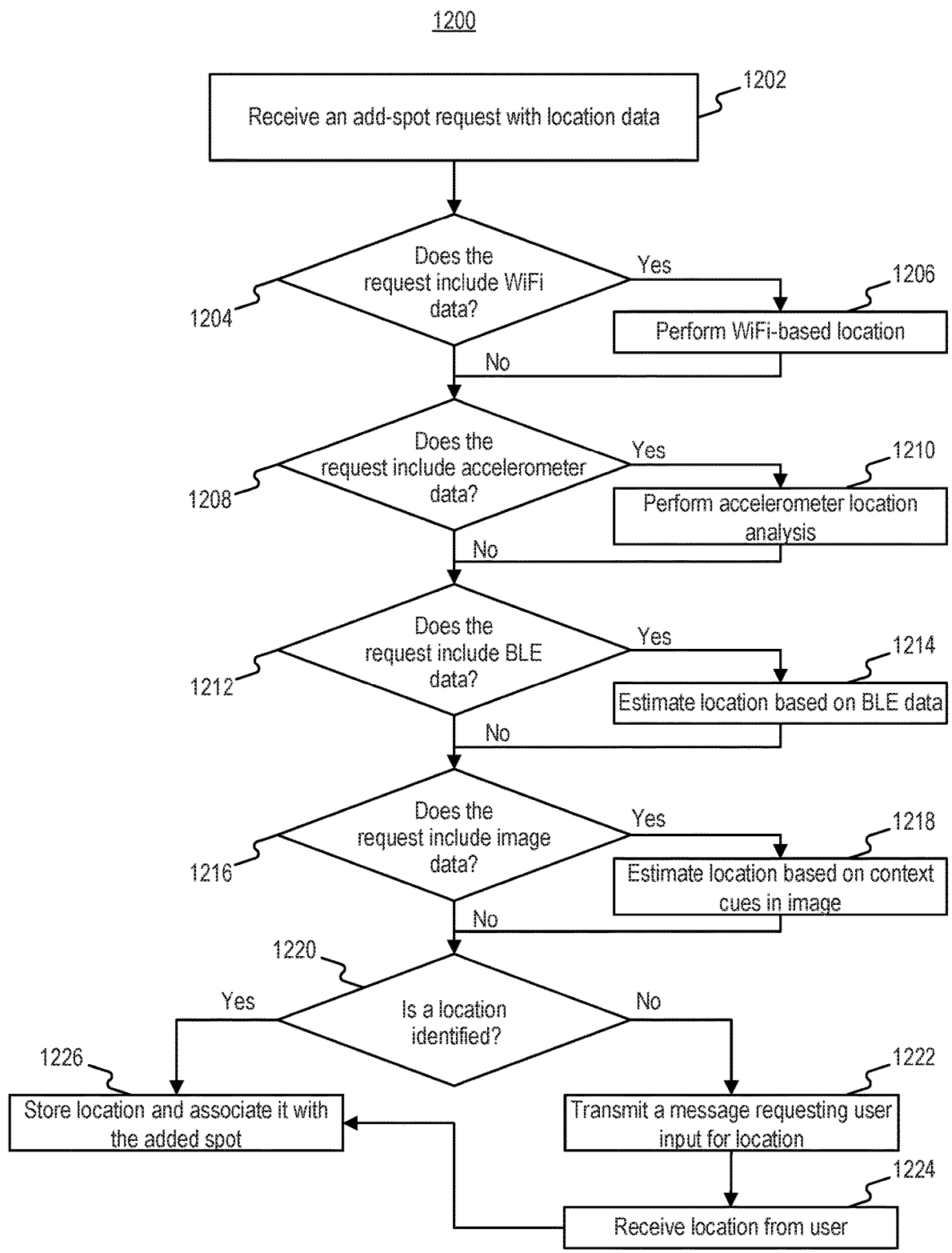
FIG. 12 is a flow chart illustrating an exemplary location identification process, consistent with disclosed embodiments.

Referring now to FIG. 12, there is shown a flow chart illustrating an exemplary location identification process 1200, consistent with disclosed embodiments. In some embodiments, process 1200 may be executed by mapping system 105. For example, location calculator 120 may perform steps in process 1200. In other embodiments, however, process 1200 may be performed in client devices 150. For example, processor(s) 502 in client devices 150 may execute instructions in navigation application 514 (FIG. 5) to perform steps in process 1200. Further, in some embodiments process 1200 may be performed by multiple elements of system 100. For example, some steps of process 1200 may be performed by mapping system 105, while other steps of process 1200 may be performed by client devices 150.

The description below of steps in process 1200 illustrates an embodiment in which mapping system 105 performs steps of process 1200. However, other elements of system 100 may also be configurable to perform one or more of the steps in process 1200. For example, client devices 150, and in particular processor(s) 502 may perform one or more steps of process 1200.

In step 1202, mapping system 105 may receive user location data. The user location data may be received from client devices 150 and/or online resources.

In step 1204, mapping system 105 may determine whether the location data includes WiFi data, such as SSID, MAC address, and historic WiFi records. If the location data includes WiFi data (step 1204: Yes), mapping system 105 may continue to step 1206. In step 1206, mapping system 105 may perform WiFi-based location. For example, mapping system 105 may engage WiFi positioner 346 from location calculator 120 (FIG. 3) and preform operations such as RSSI location to determine a location based on WiFi. If, however, location data does not include WiFi data (step 1204: No) mapping system 105 may continue to step 1208.

In step 1208, mapping system 105 may determine whether the location data includes accelerometer and/or gyroscope data. For example, mapping system 105 may determine whether the request included records of accelerometer signals. If mapping system 105 determines the location data includes accelerometer data (step 1208: Yes), mapping system 105 may continue to step 1210 and perform accelerometer location analysis. For example, mapping system 105 may use accelerometer analyzer 348 (FIG. 2) to integrate velocity and position from accelerometer and gyroscope data. In such embodiments, mapping system may convert measured acceleration to inertial frames and use that information combined with other location data (such as GPS or WiFi signals). If however, location data does not include accelerometer data (step 1208: No), mapping system 105 may skip step 1210 and continue to step 1212.

In step 1212, mapping system 105 may determine whether the location data includes BLE data. For example, mapping system 105 may determine whether the location data includes records of connection with BLE devices, such as beacons. If mapping system 105 determines there is BLE data in the location data (step 1212: Yes), mapping system 105 may continue to step 1214. In step 1214, mapping system 105 may estimate a location based on BLE data. For example, based on records of connections with BLE beacons and their intensity, mapping system 105 may estimate a location of client devices 150. In some embodiments, mapping system 105 may adjust locations in step 1214. For example, mapping system 105 may adjust or modify estimated locations with WiFi and GPS data using BLE data in step 1214. If, however, mapping system 105 determines that the request does not include BLE data (step 1212: No), mapping system 105 may skip step 1214 and continue to step 1216.

In step 1216, mapping system 105 may determine whether the request includes image data. As previously discussed in connection with FIG. 7, some requests may include verification data, which may include images of venues. For example, add-spot requests may include an image of where the spot to be added would be placed. If mapping system 105 determines that the request includes image data (step 1216: Yes), mapping system 105 may continue to step 1218 an estimate a location based on context clues in the image. For example, based on initial client devices 150 location, mapping system 105 may determine which images stored in database 180 (FIG. 4) may be present in the image data.

In some embodiments, mapping system 105 may perform image recognition to identify matching elements between images to estimate a location. In such embodiments, mapping system 105 may leverage feature correspondence and geometry estimated from large Internet photo collections to estimate location based on images. Further, mapping system 105 may perform machine-learning algorithms, such as convolutional neural network image classification, to recover structures that contain combined features unavailable when considering images in isolation. Moreover, mapping system 105 may predict which views will be the most common based on client devices 150 primary location, which feature points in a scene will be most reliable, and which features in the scene tend to co-occur in the same image. Based on this information, mapping system 105 may devise an adaptive, prioritized algorithm for matching a representative set of features covering a large scene to a query image for efficient localization. With these image-based locations, mapping system 105 may determine or adjust locations of client devices 150 and/or of a requested spot.

If, in step 1216, mapping system 105 determines that the request does not include image data (step 1216: No), mapping system 105 may skip step 1218 and continue to step 1220.

In step 1210, mapping system 105 may determine whether one of the estimation processes in steps 1206, 1210, 1214, and 1218, has identified a location. Alternatively, or additionally, mapping system 105 may determine whether the combination of the techniques has identified a location. For example, while WiFi alone may not have pinpointed the location, WiFi in combination with accelerometer analysis and BLE data may be sufficient to identify a location. If mapping system 105 determines an internal location has not been identified (step 1220: No), mapping system 105 may continue to step 1222 and transmit a message request for user input with location information. Step 1222 may include providing instructions to generate a GUI in client devices 150 that have windows for user input. For example, in step 1222 mapping system may generate instructions to display a GUI in client devices that includes a form with information to validate client devices 150 location. Alternatively, or additionally, the message in step 1222 may request coordinates from users. In step 1224, mapping system 105 may receive the location information from the user when, for example, a user interacts with GUIs generated in step 1222.

If mapping system 105 determines that a location has been identified, mapping system may skip steps 1222 and 1224 and continue to step 1226. In step 1226, mapping system 105 may store the location and associate it with a spot. For example, mapping system 105 may store the location in database 180 and associate it with a spot that was described in the add-spot request received in step 1202.

In some embodiments, in process 1200 mapping system 105 may perform operations such as determining an indoor position based on the WiFi historic data and SSID, adjusting the indoor position based on the accelerometer historic data, and adjusting the indoor position based on the BLE data.

Figure 13:
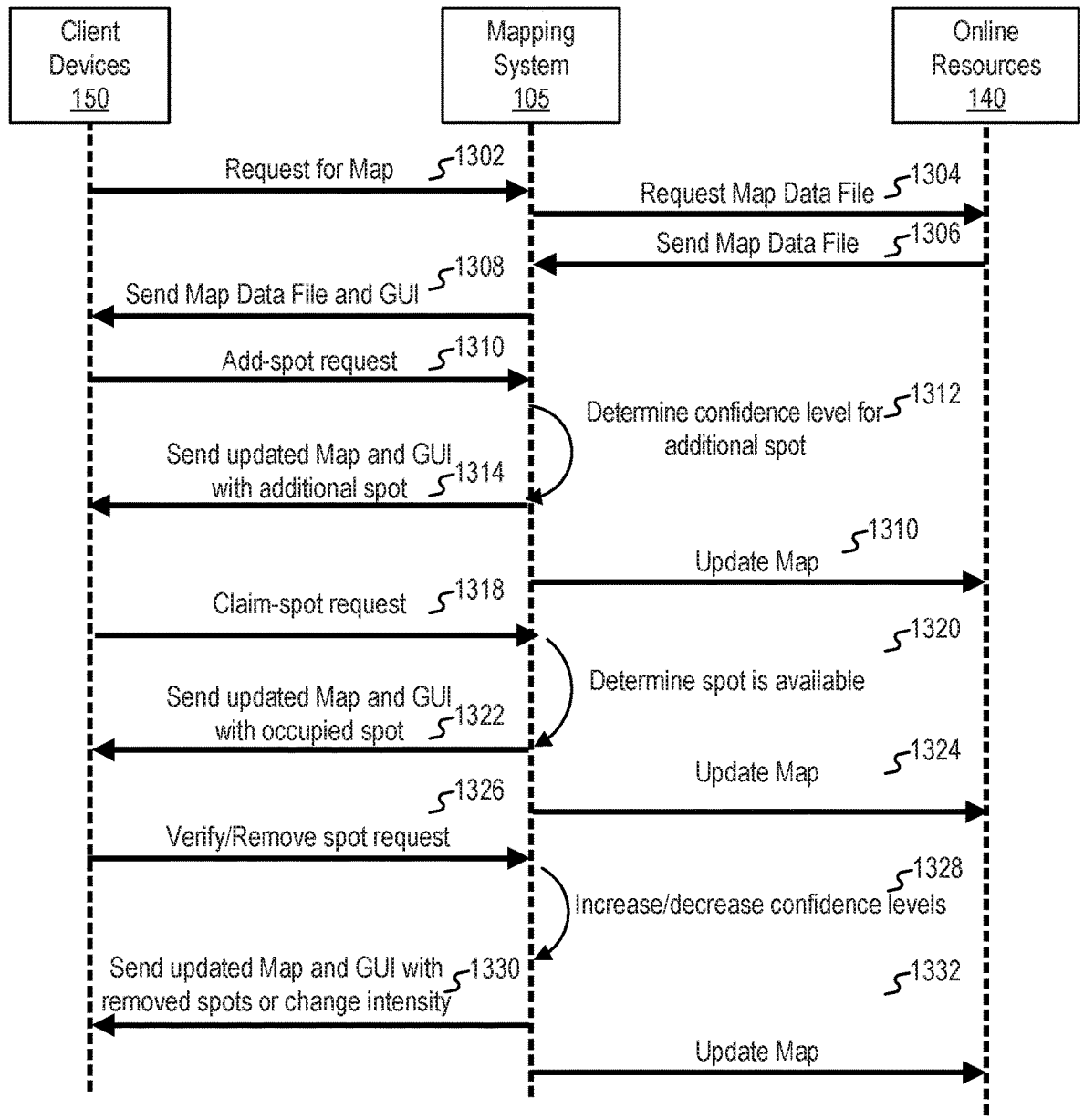
FIG. 13 is a process flow diagram illustrating an exemplary communication sequence, consistent with disclosed embodiments.

Referring now to FIG. 13, there is shown a process flow diagram illustrating an exemplary communication sequence 1300, consistent with disclosed embodiments. As shown in FIG. 13, communication sequence 1300 may involve multiple elements of system 100, including client devices 150, mapping system 105, and online resources 140. However, other elements of system 100 may be involved in communication sequence 1300. For example, database 180 may perform some of the steps of communication sequence 1300.

In step 1302, client devices 150 may transmit a map request to mapping system 1302. In some embodiments the request sent in step 1302 may include user information and initial location data. In such embodiments the user information may include information such as user credentials, account information, and operating system, and the initial or first location data may be GPS data that is associated with a place where the user is.

In some embodiments, mapping system 105 may not have map data files to respond the request. In such embodiments, mapping system 105 may request the map data file from online resources 140 in step 1304. Alternatively, mapping system 105 may query database 180 to obtain the map data files. In step 1306, online resources 140, or database 180, may send the map data file to mapping system 105. The map data file of step 1306 may include any GIS format and may be compressed to reduce network congestion.

In step 1308, mapping system 105 may send the map data file to client devices 150. Further, in step 1308 mapping system 105 may prepare and send instructions to display GUIs to client devices 150.

In some embodiments, client devices 150 may send an add-spot request to mapping system 105 in step 1310. As further discussed in connection with FIG. 7, the add-spot request may include location and verification data. Mapping system 105 may determine a confidence level for the add-spot request in step 1312. With processes such as the one described in connection with FIG. 10, mapping system 105 may retrieve and update confidence variables 224 (FIG. 2). Further, in step 1312 mapping system 105 may determine whether or not the map data file transmitted in step 1308 should be updated based on the confidence level of the spot.

In some embodiments, mapping system 105 may send an updated map data file and GUI with an additional spot in step 1314. For example, when mapping system 105 determines the additional spot has a high confidence level, mapping system 105 may update the map data file to include the additional spot and update the GUI presented in client devices 150. Further, in step 1310 mapping system 105 may send and updated map, a patch, or instructions to update the map to online resources 140, to update the map data file that is being stored in repositories.

In some embodiments, client devices 150 may send claim-spot requests. As further discussed in connection to FIG. 11, the claim-spot request may include a spot identifier. In step 1320, mapping system 105 may determine if the spot is available and the request can be fulfilled. For example, mapping system 105 may determine whether the identifier is associated with an empty seating spot or whether the user has access to the seating spot. In step 1322, depending on the determinations of step 1322, mapping system 105 may send an updated map and GUI with the occupied spot to client devices 150. Alternatively, or additionally, in step 1322 mapping system 105 may send a patch to client devices 150 to update the map or GUI without sending the full file to minimize network congestion. Like in step 1310, in step 1324 mapping system 105 may send and updated map, a patch, or instructions to update the map to online resources 140, to update the map data file that is being stored in repositories.

In some embodiments, in step 1326 client devices 150 may send a verify request to mapping system 105. For example, as further described in connection to FIG. 15, a user may send requests to verify, add, or remove spots using buttons in GUIs. Further, as described in connection with FIGS. 8 and 9, requests sent in step 1326 may include location, identifier, and verification data.

In step 1328, mapping system 105 may determine whether to increase or decrease confidence level associated with spots in the request of step 1326. For example, if the request is for removing a spot, mapping system 105 may retrieve confidence variables and decrease their value. Alternatively, if the request is for verifying a spot, mapping system 105 may retrieve confidence variables and increase confidence levels stored in the variables. Based on the calculations of step 1328, mapping system 105 may update map data files, generate patches, and/or update GUIs. Thus, in step 1330 mapping system 105 may send updated map data files, updated GUIs, and/or patches with removed, added, or verified spots in step 1330. In step 1332 mapping system 105 may send and updated map, a patch, or instructions to update the map to online resources 140, or database 180, to update the map data file that is being stored in repositories.

Figure 14:
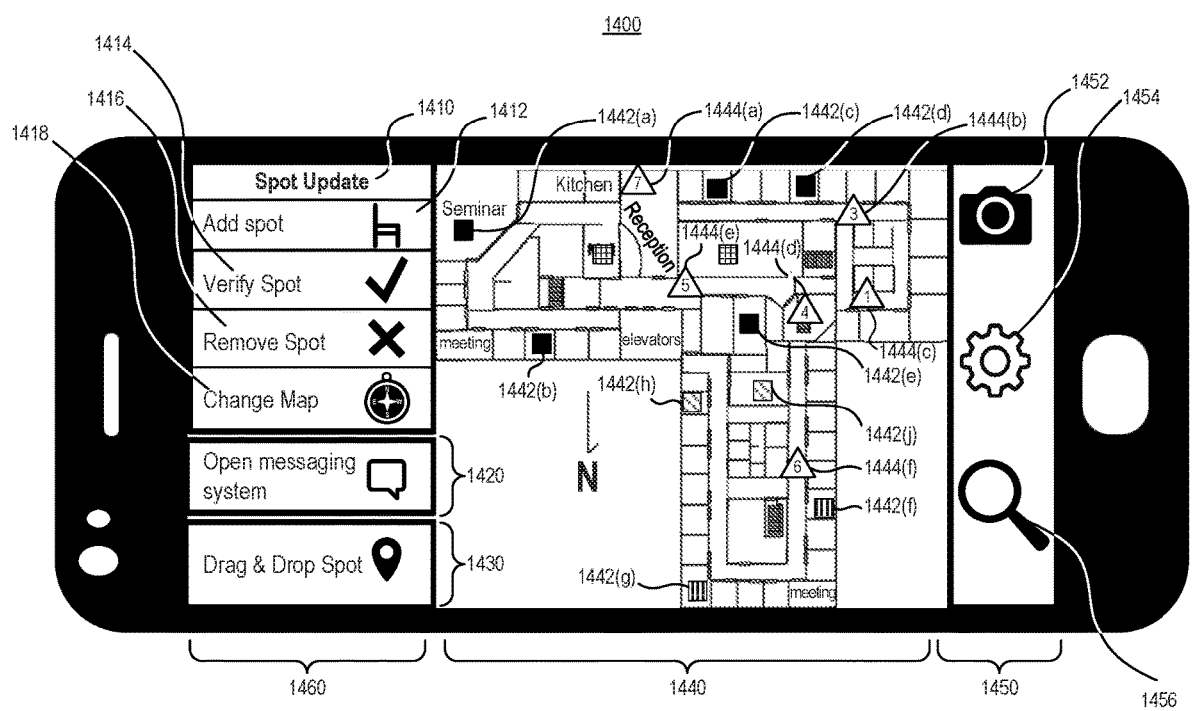
FIG. 14 is a first exemplary graphical user interface showing an interactive digital map, according with disclosed embodiments.

Referring now to FIG. 14, there is shown an exemplary GUI 1400, consistent with disclosed embodiments. In some embodiments, GUI 1400 may be displayed on a client device 150.

GUI 1400 may be displayed when a user opens navigation application 514 (FIG. 5) in client device 150. For example, when a user opens navigation application 514, client device 150 may be configured to generate GUI 1400 as shown in FIG. 14. In such embodiments, client devices 150 may send messages to mapping system 105 to request maps when a user opens navigation application 514.

GUI 1400 may include an update section 1410, which may include an add-spot button 1412, a verify-spot button 1414, and a remove-spot button 1416. Each one of these buttons may be configured to send requests to mapping system 105 when a selected by a user. Further, as shown in FIG. 14, update section 1410 may include a change-map button 1418, which may be configured to request a different map data file from mapping system 105.

GUI 1400 may also include a message button 1420, which may be configured to open a messaging system between client device 150 that runs navigation application 514. In such embodiments, messages may be broadcasted or exchanged between client device 150 when it opens the messaging system associated with message button 1420.

GUI 1400 may include map area 1440. As shown in FIG. 14, map area 1440 may display the layout of a place, such as a venue or an office building. Map area 1440 may be interactive and allow users to zoom in, zoom out, calculate distances, expand, and or shrink. With these features map area 1440 may improve user interaction with GUI 1400 and allow efficient screen space management.

Further, GUI 1400 may include a drag & drop button 1430. Drag and drop button 1430 may generate an icon that may be placed in map area 1440. For example, a user may select drag & drop button 1430 to generate a seat spot icon that generates an add-spot request when placed somewhere in map area 1440. In some embodiments, update section 1410, message button 1420, and drag & drop button 1430 may be grouped in a panel 1460.

Map area 1440 may include seating spots 1442. Seating spots 1442 may have different intensity values. For example, spot 1442(g) may have a lower intensity than spot 1442(c) because spot 1442(c) has a higher confidence level. Seating spots 1442 may be located in different positions of map area 1400 and may be associated with different coordinates and locations within map area 1400. In some embodiments, seating spots 1442 may be color-coded. For example, seating spots 1442 that are displayed as green may be available but seating spots 1442 that are displayed as red are not available. Seating spots 1442 may also be buttons that when selected allow users to verify and/or remove spots in other GUIs. In some embodiments, map area 1440 may include a plurality of spots 1442 corresponding to a plurality of seating spots in the real-life venue, and each of the seat buttons may be associated with a corresponding uniform resource identifier (URI).

Map area 1400 may also include context elements 1444, which may indicate specific elements within the map that may facilitate navigation or identify locations. Context elements 1444 may include stairs, columns, and/or fixed elements in specific locations that may help a user navigate in the venue. Similar to spots 1442, context elements 1444 may also be buttons that generate new graphical user interfaces when selected.

GUI 1400 may also include a menu section 1450 that may include a camera button 1452, a settings button 1454, and a search button 1456.

Figure 15:
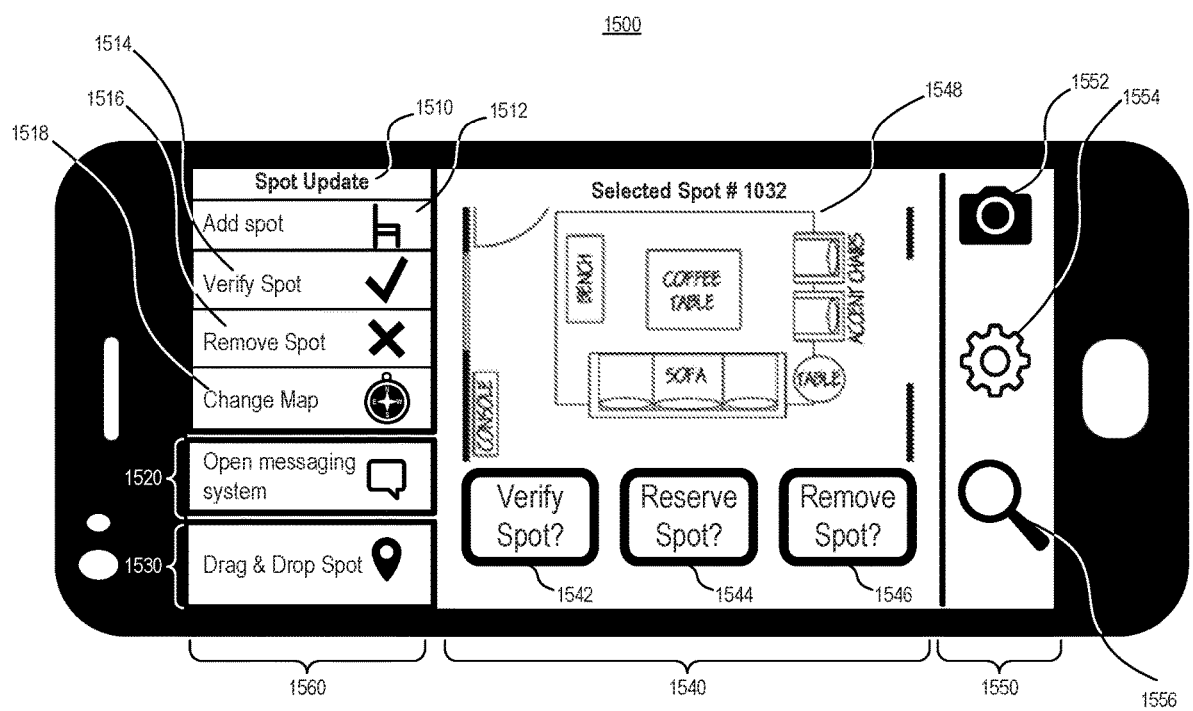
FIG. 15 is a second exemplary graphical user interface showing a map editing window, according with disclosed embodiments.

Referring now to FIG. 15, there is shown an exemplary GUI 1500, consistent with disclosed embodiments. In some embodiments, GUI 1500 may be displayed in client devices 150.

GUI 1500 may be displayed when a user selects one of seating spots 1442. Alternatively, or additionally, GUI 1500 may be displayed when one of the buttons in update section 1510 is selected. For example, GUI 1500 may be displayed by transmitting instructions to display a second GUI when receiving one of the URIs associated with one of the plurality of seat buttons.

Similar to GUI 1400, GUI 1500 may also include an update section 1510, which may include an add-spot button 1512, a verify-spot button 1514, and a remove-spot button 1516. Further, update section 1510 may include a change-map button 1518. GUI 1500 may also include a message button 1520 and drag & drop spot button 1530. As shown in FIG. 15, update section 1510, message button 1520, and drag & drop spot button 1530 may be grouped in panel 1560.

GUI 1500 may also include a menu section 1550 that may include a camera button 1552, a settings button 1554, and a search button 1556.

In GUI 1500 map area 1440 of FIG. 14 may be replaced with a selected spot area 1540. Selected spot area 1540 may zoom in a portion of map area 1440 and display more detail in the map. This arrangement may facilitate use of the digital map, particularly in small screen devices, improving the field of graphical user interface generation and digital mapping. Selected spot area 1540 may include a verify-selection button 1542, a reserve-selection button 1544, and a remove-selection button 1546. Each one of these buttons may trigger processes further described connection with FIGS. 7, 8, 9, and 11. Moreover, selected spot area 1540 may include a specific display 1548 for the selected spot, which may detail features and key element of the selected spot.

Figure 16:
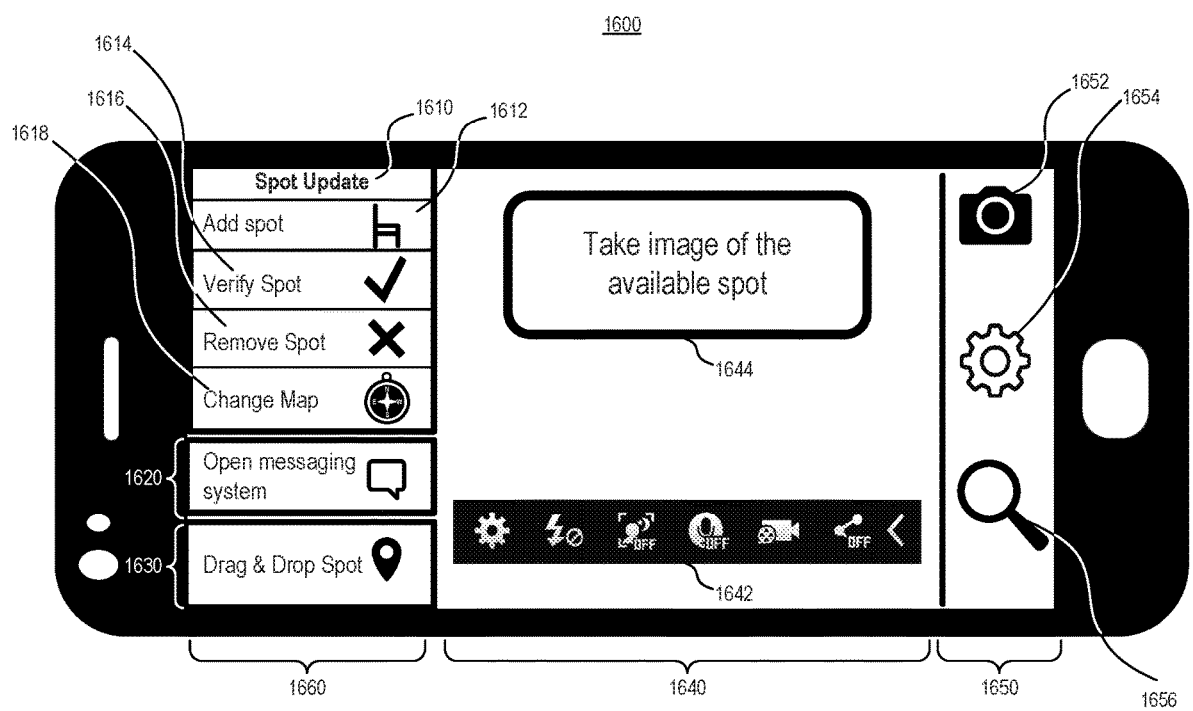
FIG. 16 is a third exemplary graphical user interface showing a capture-image window, according with disclosed embodiments.

Referring now to FIG. 16, there is shown an exemplary GUI 1600, consistent with disclosed embodiments. In some embodiments, GUI 1600 may be displayed in client devices 150.

GUI 1600 may be displayed when a user selects one of seating spots 1442 (FIG. 14). Alternatively, or additionally, GUI 1600 may be displayed when one of the buttons in update section 1510, such as verify button 1414, is selected. In other embodiments, GUI 1600 may be displayed when a user selects buttons in selected spot area 1540, such as verify selection button 1542.

GUI 1600 may also include an update section 1610, which may include an add-spot button 1612, a verify-spot button 1614, and a remove-spot button 1616. Further, update section 1610 may include a change-map button 1618. GUI 1600 may also include a message button 1620 and drag & drop spot button 1630. As shown in FIG. 16, update section 1610, message button 1620, and drag & drop spot button 1630 may be grouped in panel 1660.

GUI 1600 may also include a menu section 1650 that may include a camera button 1652, a settings button 1654, and a search button 1656.

GUI 1600 may also include a verification area 1640. As previously discussed in connection with FIG. 10, some add-spot request or verification-spot requests may include images that help mapping system 105 to determine whether a spot should be added, verified, or removed. For such requests, a user may activate camera 520 (FIG. 5) through GUI 1600 and capture images in verification area 1640.

Verification area 1640 may include picture buttons 1642 and a message 1644 displaying instructions for users of client devices 150.

Figure 17:
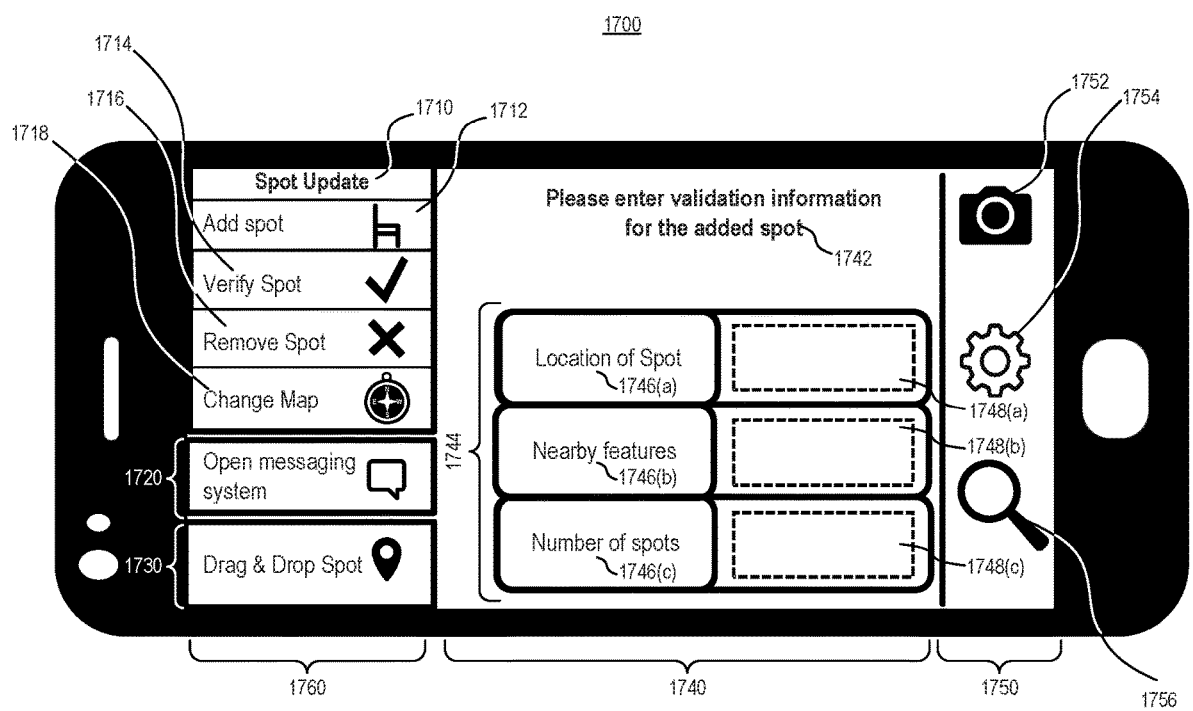
FIG. 17 is a fourth exemplary graphical user interface showing an added-spot verification window, according with disclosed embodiments.

Referring now to FIG. 17, there is shown an exemplary GUI 1700, consistent with disclosed embodiments. In some embodiments, GUI 1700 may be displayed in client devices 150.

In some embodiments, GUI 1700 may be displayed when locations cannot be determined for a client device 150. For example, GUI 1700 may be displayed in client device 150 at step 1222 (FIG. 12), when mapping system 105 is unable to identify a location. Alternatively, or additionally, GUI 1700 may be displayed when one of the buttons in update section 1410, such as verify button 1414, is selected. In other embodiments, GUI 1700 may be displayed when a user selects buttons in selected spot area 1540, such as verify selection button 1542.

GUI 1700 may include an update section 1710, which may include an add-spot button 1712, a verify-spot button 1714, and a remove-spot button 1716. Further, update section 1710 may include a change-map button 1718. GUI 1700 may also include a message button 1720 and drag & drop spot button 1730. As shown in FIG. 17, update section 1710, message button 1720, and drag & drop spot button 1730 may be grouped in panel 1760.

GUI 1700 may also include a menu section 1750 that may include a camera button 1752, a settings button 1754, and a search button 1756.

GUI 1700 may include a form area 1740 that may be displayed to collect user information when adding, removing, or verifying a spot. Form area 1740 may include a form 1744 which may include labels 1746 associated with text boxes 1748. In some embodiments, text boxes 1748 may include other type of user input, such as slide bars, radio buttons, or drop-down menus. Form area 1740 may also include a message 1742 with instructions for users.

Figure 18:
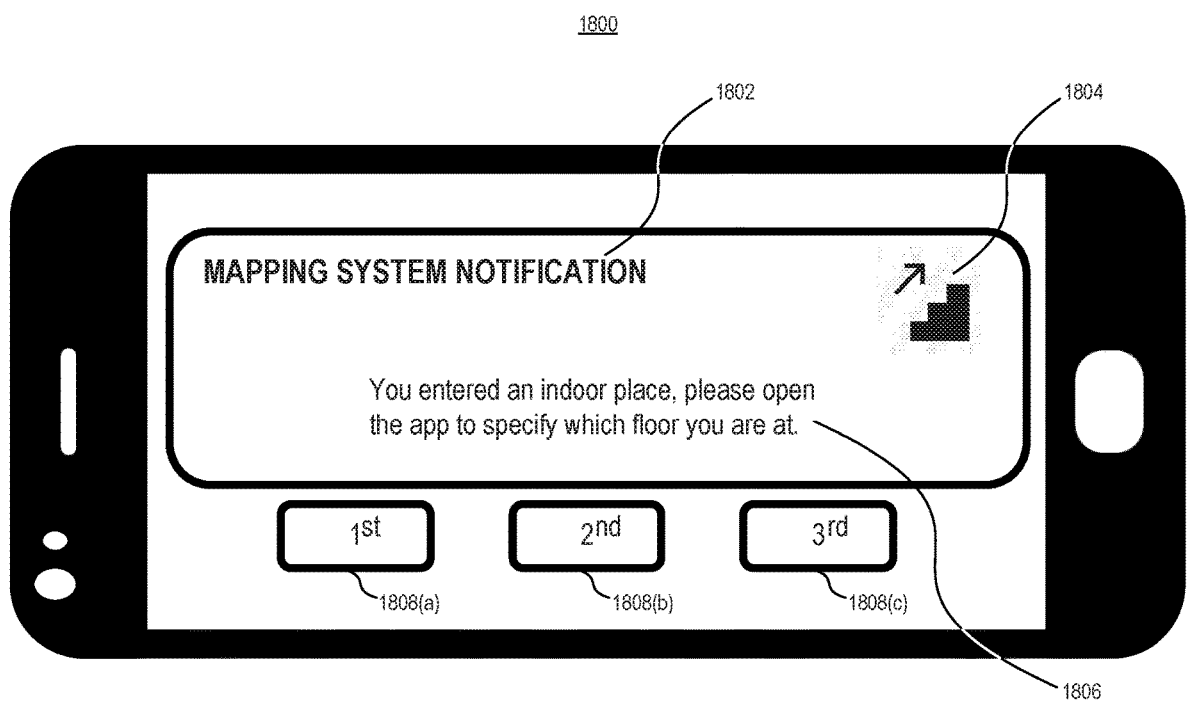
FIG. 18 is a fifth exemplary graphical user interface showing a notification message, according with disclosed embodiments.

Referring now to FIG. 18, there is shown an exemplary GUI 1800, consistent with disclosed embodiments. In some embodiments, GUI 1800 may be displayed in a client device 150 and may be displayed when mapping system 105 identifies that the user is located in a venue with multiple floors. For example, GUI 1800 may be displayed as a push notification once client devices 150 request a map from a location that has multiple levels or floors. In such embodiments, a client device 150 requesting a map of a venue may receive instructions to display GUI 1800.

GUI 1800 may include an alert message 1802, an associated icon 1804, and a message 1806. Further, GUI 1800 may include response buttons 1808. In some embodiments, as shown in FIG. 18, response buttons 1808 may provide a quick response for mapping system 105 query, indicating which floor is relevant for client devices 150. Response buttons 1808 may specify whether the relevant map is for first, second, or third floor. For example, buttons 1808 may have specific call-to-action functions to indicate location of the user. With this information, mapping system 105 update or provide map data files that are relevant to users.

In some embodiments, GUI 1800 may be displayed when location identification is unsuccessful. For example, when BLE, WiFi, and accelerometer data are insufficient to determine the floor location of a user, GUI 1800 may get pushed to a client device 150, prompting a user to gather more information about the user's location. In such embodiments, mapping system 105 may perform operations such as receiving the map request from a client device, determining whether the place is indoors based on the first location data, transmitting a push notification to the client device requesting a floor level, receiving, from the client device, the floor level, and transmitting the map data file for the floor level.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted. Furthermore, while some of the exemplary embodiments of the computerized methods were described using Java language or C to illustrate exemplary scripts and routines, the disclosed methods and systems may be implemented using alternative languages. The disclosed embodiments may use one or multiple programming languages in addition to Java or C. For example, the disclosed embodiments may also be implemented using Python, C++, C#, R, Go, Swift, Ruby, and/or their combinations.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for generating an interactive map with spots, the system comprising:
   one or more processors;
   one or more client devices; and
   one or more storage devices storing instructions that, when executed, configure the one or more processors to perform operations comprising:
      receiving a map request of a venue, the map request comprising first location data associated with the venue;

transmitting a map data file for the venue, the map data file comprising a presentation of a plurality of spots in the venue, the spots being associated with confidence levels;

receiving an add-spot request, the add-spot request comprising:
data of an additional spot to be added to the map data file;
second location data associated with the additional spot; and
verification data;

determining a confidence level for the additional spot by comparing the add-spot request with stored add-spot requests;

modifying the map data file to include a representation of the additional spot when the confidence level is above a threshold; and transmitting the modified map data file to at least one of the one or more client devices, wherein
the at least one of the one or more client devices is configured to generate a first graphical user interface (GUI) displaying the modified map data file, the first GUI comprising:
a map section displaying an interactive map of the venue, the map section comprising a plurality of seat buttons corresponding to the plurality of spots, each of the seat buttons being associated with a corresponding uniform resource identifier (URI);
a message button; and
an update section.

2. The system of claim 1, wherein the operations further comprise:
receiving, from one of the one or more client devices, a claim-spot request comprising an identifier of a requested spot, the identifier comprising a coordinate;
determining whether the requested spot is available;
if the requested spot is determined to be unavailable, transmitting a decline message to the one of the one or more client devices;
if the requested spot is determined to be available:
modifying the map data file to indicate that the requested spot is currently unavailable; and
transmitting the modified map data file to the one of the one or more client devices.

3. The system of claim 1, wherein
the venue is an indoor venue; and
the first location data comprises GPS location data.

4. The system of claim 3, wherein
the second location data comprises an SSID, a MAC address, and WiFi historic data;
determining the confidence level for the additional spot comprises comparing the second location data with location data of the stored add-spot requests; and
the operations further comprise determining an indoor position based on the WiFi historic data and SSID.

5. The system of claim 4, wherein
the second location data further comprises accelerometer historic data; and
the operations further comprise adjusting the indoor position based on the accelerometer historic data.

6. The system of claim 5, wherein
the second location data further comprises Bluetooth Low Energy (BLE) data; and
the operations further comprise adjusting the indoor position based on the BLE data.

7. The system of claim 1, wherein
the verification data comprises an image of the additional spot; and
the operations further comprise:
identifying context clues from the image; and
adjusting the confidence level based on a number of the identified context clues.

8. The system of claim 1, wherein
the update section comprises an add-spot button, a verify-spot button, a remove-spot button, and a change-map button; and URIs encode spot IDs and intensities for each of the plurality of spots, the intensities being associated with a corresponding confidence level.

9. The system of claim 8, wherein the update section further comprises a drag & drop icon.

10. The system of claim 8, wherein the first GUI displays the seat buttons with intensities based on confidence levels of the corresponding spots.

11. The system of claim 8, wherein the operations further comprise:
transmitting instructions to display a second GUI when receiving one of the URIs associated with one of the seat buttons;
wherein the second GUI comprises a selected spot area displaying a zoomed portion of the map section, the selected spot area comprising a verify-selection button, a reserve-selection button, and a remove-selection button.

12. The system of claim 11, wherein:
the second GUI further comprises the update section; and
each of the verify-selection button, the reserve-selection button, and the remove-selection button is associated with a specific call-to-action function comprising one or more HTTP requests for the system.

13. The system of claim 1, wherein the operations further comprise:
receiving a spot verification request, the spot verification request comprising an identifier of a verified spot, the identifier comprising a coordinate;
identifying a confidence variable associated with the verified spot based on the identifier; and
increasing a confidence level stored in the confidence variable.

14. The system of claim 1, wherein the operations further comprise:
receiving a spot removal request, the spot removal request comprising an identifier of a removed spot, the identifier comprising a coordinate;
identifying a confidence variable associated with the removed spot based on the identifier; and
decreasing a confidence level stored in the confidence variable.

15. The system of claim 1, wherein determining the confidence level comprises:
retrieving add-spot requests associated with the venue from a database coupled with the one or more processors;
determining whether a minimum number of add-spot requests has been received for the additional spot; and
assigning a confidence level to the additional spot that is above the threshold when the minimum number of requests has been received for the additional spot.

16. The system of claim 1, wherein
receiving the map request comprises receiving the map request from a client device; and transmitting the map data file comprises:
    determining whether the venue is an indoor venue, based on the first location data;
    transmitting a push notification to the client device requesting a floor level;
    receiving, from the client device, the floor level; and
    transmitting the map data file for the floor level.

17. The system of claim 1, wherein
the venue is an office building; and
the add-spot request comprises a request for a plurality of consecutive additional seating spots and a description of locations of the consecutive additional seating spots.

18. The system of claim 1, wherein transmitting the map data file comprises:
    determining a relevant radius based on the first location data and the map data file;
    cropping the map data file to an area that matches the relevant radius;
    generating a compressed map data file by compressing the map data file; and
    transmitting the compressed map data file.

19. A non-transitory computer-readable medium storing instructions that, when executed by a processor, cause the processor to operate a system for generating a map with spots, the operations comprising:
    receiving from one or more client devices a map request of a venue, the map request comprising first location data associated with the venue;
    transmitting a map data file for the venue, the map data file comprising a presentation of a plurality of seating spots in the venue, the seating spots being associated with confidence levels;
    receiving, at a server, an add-spot request, the add-spot request comprising:
        data of an additional spot to be added to the map data file;
        second location data associated with the additional spot;
        and verification data;
    determining a confidence level for the additional spot by comparing the add-spot request with stored add-spot requests in the server;
    modifying, by the server, the map data file to include a representation of the additional spot when the confidence level is above a threshold;
    transmitting the modified map data file from the server to at least one of the one or more client devices; and
    generating, by the at least one or more client devices, a first graphical user interface (GUI) displaying the modified map data file, the first GUI comprising:
        a map section displaying an interactive map of the venue, the map section comprising a plurality of seat buttons corresponding to the plurality of spots, each of the seat buttons being associated with a corresponding uniform resource identifier (URI);
        a message button; and
        an update section.

20. A computer-implemented method for generating a map with seating spots, the method comprising:
    receiving from one or more client devices a map request of a venue, the map request comprising first location data associated with the venue;
    transmitting a map data file for the venue, the map data file comprising a presentation of a plurality of seating spots in the venue, the seating spots being associated with confidence levels;
    receiving, at a server, an add-spot request, the add-spot request comprising:
        data of an additional spot to be added to the map data file;
        second location data associated with the additional spot;
        and verification data;
    determining a confidence level for the additional spot by comparing the add-spot request with stored add-spot requests in the server;
    modifying, by the server, the map data file to include a representation of the additional spot when the confidence level is above a threshold;
    transmitting the modified map data file from the server to at least one of the one or more client devices; and
    generating, by the at least one or more client devices, a first graphical user interface (GUI) displaying the modified map data file, the first GUI comprising:
        a map section displaying an interactive map of the venue, the map section comprising a plurality of seat buttons corresponding to the plurality of spots, each of the seat buttons being associated with a corresponding uniform resource identifier (URI);
        a message button; and
        an update section.

* * * * *